(12) United States Patent
Williams

(10) Patent No.: US 12,633,742 B1
(45) Date of Patent: May 19, 2026

(54) SYSTEMS AND METHODS FOR SOLAR ENERGY DISTRIBUTION AND CONTROL

(71) Applicant: Thomas Holtzman Williams, Longmont, CO (US)

(72) Inventor: Thomas Holtzman Williams, Longmont, CO (US)

(*) Notice: Subject to any disclaimer, the term of this patent is extended or adjusted under 35 U.S.C. 154(b) by 0 days.

(21) Appl. No.: 19/357,635

(22) Filed: Oct. 14, 2025

Related U.S. Application Data

(63) Continuation-in-part of application No. 18/939,234, filed on Nov. 6, 2024, now abandoned.

(51) Int. Cl.
H02J 1/12 (2026.01)
H02J 101/24 (2026.01)

(52) U.S. Cl.
CPC ............. H02J 1/12 (2013.01); *H02J 2101/25* (2026.01)

(58) Field of Classification Search
CPC ...... H02J 1/12; H02J 1/102; H02J 3/38; H02J 2300/26; H02J 3/40; H02J 3/44; H02J 3/46; H02J 3/466; H02J 3/50; H02J 2101/25; Y10T 307/707

USPC ...................................................... 307/43, 82
See application file for complete search history.

(56) References Cited

PUBLICATIONS https://electronics.stackexchange.com/questions/542906/is-there-such-a-thing-as-a-constant-power-source, Jan. 16, 2021.
https://www.analog.com/en/resources/design-notes/constantpower-source.html, Oct. 27, 2009.

*Primary Examiner* — Hal Kaplan

(57) ABSTRACT

A universal power conversion system for a solar panel array includes a first solar panel generating a first power output; a second solar panel generating a second power output different from the first power output; a common DC bus in communication with the first and second solar panels; a first switching power converter between the first solar panel and the common DC bus, which receives the first power output, and outputs a third power output at a first MPP; a controller which receives, from the common DC bus, the third power output at the first MPP and the second power output in parallel with the third power output. The second power output is maintained at a second MPP to achieve an MPP-maintained fourth power output. The controller further combines the third power output with the MPP-maintained fourth power output, and produces a combined output for a destination sink.

20 Claims, 14 Drawing Sheets

SYSTEMS AND METHODS FOR SOLAR ENERGY DISTRIBUTION AND CONTROL

CROSS REFERENCE TO RELATED APPLICATIONS

This application is a continuation in part of U.S. application Ser. No. 18/939,234, filed Nov. 6, 2024, the entirety of which is incorporated by reference herein.

FIELD

The field of the invention relates generally to solar power transfer systems, and more specifically, to systems and methods utilizing innovative DC converters for improved collection, control, and delivery of solar energy from heterogeneous solar collector devices.

BACKGROUND

There is a need to transfer electrical energy between Direct Current (DC) devices that have different electrical characteristics, such as operating voltage, maximum power, charge and discharge rates. This need is particularly pronounced for arrays of solar panels, where one or more panels in the array receive significantly different amounts of sunlight, respectively. One energy efficient method of making a power transfer is using a switching circuit where switches are rapidly turned off and on, and energy is stored, usually in an inductor.

The Joule is the unit of energy in the International System of Units (SI). It is equal to the amount of work done when a force of one newton displaces a mass through a distance of one meter in the direction of that force. It is also the energy dissipated as heat when an electric current of one ampere passes through a resistance of one ohm for one second. It is also the energy delivered by one Watt of power for one second. Energy is power times time in seconds. It is named after the English physicist James Prescott Joule (1818-1889).

There are multiple types of regulated switching power supplies including Buck Converter, Boost Converter, Inverting Buck-Boost Converters, SEPIC, Cuk Converter, Zeta Converter, Flyback Converter, Two Switch Flyback Converter, Active Clamp Forward Converter, Single Switch Forward Converter, Two Switch Forward Converter, and Push-Pull Converter. A common design requirement is to receive a variable DC input voltage and deliver a steady regulated output voltage to a load.

One problem in the solar paradigm can be seen when combining a plurality of solar panels to make a DC or AC power supply is solar panel balance. Each solar panel has an optimal loading point or MPP (maximum power point) to produce its maximum power output. The MPP depends on a number of factors, especially a level of illumination, but also its temperature, and manufacture. However, if some panels in an array of panels become shaded while others are in full sun, a single loading will be sub-optimal for individual panels if panels are simply connected in parallel or series. For example, a shadow can cover some panels in an array but not others. Snow or dirt on the panel's glass can also affect illumination. Some of the panels may be located on one side of a roof to catch a morning sun while other panels may be mounted on the other side of the roof to catch an afternoon sum. Also, some of the panels could be warmer than others, caused by wind currents or shading.

Currently, a low cost of solar panels is prompting use of solar panels as building materials, such as roof panels or siding. These panels are unlikely to have equal solar loading. Unfortunately, the cost of electronics for each panel is a significant portion of total cost.

A common connection technique for connecting solar panels is to connect the panels in series, typically creating an output voltage of hundreds of DC volts. This technique works well when all panels receive a substantially a same amount of illumination for similarly sized panels, and features low power loss from wiring resistance. However, dangerous voltages may be generated using such conventional techniques. Furthermore, in the conventional paradigm, conversion efficiency will typically fall rapidly when member panels in an array have unequal illumination. There is also a need to have a safety disconnect for use by emergency personnel. If some panels in an array receive partial illumination, this can be improved with devices called "power optimizers", such as are supplied by SolarEdge and Tigo.

One power combining solution is to convert each panel's DC voltage into mains AC voltage (230 VAC) and combine AC outputs from each panel/converter. One solution is an expensive inverter circuits for each panel. This approach is used by Enphase for their DC-AC converters. In both inverter and Power Optimizer applications, one module is typically connected to each panel. These modules can also report diagnostic data on each panel.

There are applications for solar installations that both connect to a grid and have local batteries. Each DC-AC and AC-DC power conversion suffers a conversion loss, so it is an advantage to charge DC batteries from solar panels that provide DC and only make AC power with an inverter once.

It is an object of this invention to transfer energy from a DC source into a DC load using a discrete number of energy packets, each containing a known energy. It is also an object of this invention to control the rate of energy transfer by control of peak inductor current and switching frequency. Another object of this invention is to transfer each panel's DC energy into a battery. This could be used to rescue stranded electric cars with dead batteries, or to extend the range of electric vehicles.

It is an object of this invention to make a low cost SJPC (Switching Joule Power Converter) for connecting mismatched solar panels in parallel while maintaining each panel at its MPP (Maximum Power Point). It is also an object of this invention to make a low cost versatile flexible power supply that can deliver either a controlled quantized discharging inductor energy supply, an adjustable current source, or an adjustable voltage source. It is also an object of this invention to make a low cost circuit to accompany each solar panel to enable a shared DC-AC converter architecture. It is an object of this invention to allow solar panels with different rated output voltages to be used in an array.

Delivering a precise number of Joules of energy into a load can also be used to control temperature rise. For example, a temperature of a baby bottle directly out of a refrigerator can be set knowing a thermal mass and desired temperature increase, without using a thermometer or other feedback mechanism.

Other variable loads include electrolysis, electrolytic plating, and heating. Other variable power sources besides solar cells are wind generators, water turbines, super-capacitors, thermo-voltaic cells, fuel cells and chemical processes producing electric current such as fuel cells or flow batteries. Switching Joule packet converters are used between DC outputs of multiple solar panels and an input of a shared DC-AC inverter or a DC-DC converter. A use of discrete inductive energy discharges on individual SJPCs allow power from multiple solar panels to be asynchronously combined at a common DC input of a shared DC-AC inverter. The load on individual solar panels are each maintained at a maximum power point (MPP) for each panel using pulse width modulation to set inductor energy. This maintains each solar panel operating at its MPP, regardless of its solar illumination. The SPS can use a Buck-Boost, Buck or a Boost switching circuit to precisely extract energy from each panel using quantized energy packets determined by an inductor charge time.

In circuit design there are theoretical elements called "voltage sources" and "current sources." If a voltage source is shorted with a perfect conductor, its current output goes to infinity. If a current source is left open circuited, its output voltage will go to infinity. This new invention introduces a new theoretical element which can be called a "power source" which delivers a constant power. If it is shorted out it will theoretically supply infinite current, and if it is left open it will theoretically output infinite voltage. When connected to any value resistor, it delivers a same power output. This specification is one DC embodiment of this new element and power sources can be used for combining energy devices, such as solar panels or wind generator. There can be other DC embodiments and an AC "power source" is anticipated.

Another problem with conventional converter design is seen with respect to the limited range on battery powered vehicles. This problem is exacerbated by limited availability of charging stations and long wait times required to charge batteries. Complicating this issue is a use of different non-standard voltages on battery packs. It is an object of this invention to enable a rescue of stranded cars with dead batteries or extend range using a universal SJPC (Switching Joule Packet Converter).

SUMMARY

A DC-DC switching Joule packet converter (SJPC) circuit with a regulated or unregulated DC input and a power controlled DC output which can be used to deliver energy into multiple types of loads. The SJPC circuit is comprised of a inductor that is charged from the DC input source by a switching transistor and discharged through a switch (diode or FET) into a DC load which is an energy sink. The SJPC's output power is controlled by adjusting a pulse width of the switching transistor and varying switching frequency. The SJPC's output energy delivery is controlled by counting pulses. Said converter is capable of operating in constant voltage mode, constant current mode, or constant power mode by transistor switching. Said converter is capable of operating in discontinuous or continuous current mode.

In an aspect of the invention, an SJPC system is provided for extracting maximum power from individual solar panels, forming a plurality of combinable DC outputs, and connecting said outputs in parallel to a shared energy sink.

In an embodiment, a universal power conversion system for a solar panel array includes a first solar panel configured to generate a first power output; a second solar panel configured to generate a second power output different from the first power output; a common direct current (DC) bus in operable communication with the first and second solar panels; a first switching power converter disposed between the first solar panel and the common DC bus, and configured to (i) receive the first power output, and (ii) output a third power output maintained at a first maximum power point (MPP); a controller configured to (i) receive, from the common DC bus, the third power output at the first MPP, (ii) receive, from the common DC bus, the second power output in parallel with the third power output, wherein the second power output is maintained at a second MPP to achieve an MPP-maintained fourth power output, and (iii) combine the third power output with the MPP-maintained fourth power output, and (v) produce a combined output for a destination sink.

In an embodiment, a universal power conversion system is provided for solar energy collection and distribution. The system includes a first switching power converter connected to a common direct current (DC) bus and configured to (i) receive a first input voltage from a first solar panel, and (ii) output a first plurality of discrete energy packets over time to the common DC bus at a first packet delivery rate; and a second switching power converter connected to the common DC bus and configured to (i) receive a second input voltage from a second solar panel different from the first solar panel, and (ii) output a second plurality of discrete energy packets over time to the common DC bus at a second packet delivery rate different from the first packet delivery rate. The second input voltage is less than the first input voltage. Each first energy packet of the first plurality of discrete energy packets has substantially the same per-packet energy, in Joules-per-packet, as (i) other first energy packets of the first plurality of discrete energy packets, and (ii) each second energy packet of the second plurality of discrete energy packets. The common DC bus is configured to deliver all of the first and second energy packets to a destination sink at respectively, substantially same per-packet energy.

In an embodiment, a method is provided for delivering a plurality of discrete energy packets from a first solar panel to a destination sink as a plurality of sequential discrete energy packets. The method includes charging an inductor, from the first solar panel, to a percentage of a predetermined maximum inductor current value for the inductor; discharging, to the destination sink, the inductor to a minimum inductor current value; setting a switching cycle according to a rate of the charging and discharging of the inductor; determining a per-packet energy value, in Joules, corresponding to one pulse of the switching cycle; calculating (i) an amount of Joules required to deliver a predetermined total energy amount to the destination sink, (ii) a number of pulses needed to reach the required amount of Joules; and generating a plurality of pulses according to the switching cycle. Each generated pulse of the plurality of pulses corresponds to a respective energy packet of the plurality of sequential discrete energy packets. The method further includes counting pulses of the generated plurality of pulses; and executing, upon reaching the number of pulses needed to reach the required amount of Joules, at least one of (i) shutting down operation of the converter, and (ii) placing the converter in standby or float mode.

In an aspect of the invention, an SJPC system is provided for delivering power or energy from a charged battery into a stranded vehicle's battery to rescue it or to extend its range.

BRIEF DESCRIPTION

These and other features, aspects, and advantages of the present disclosure will become better understood when the following detailed description is read with reference to the following accompanying drawings, in which like characters represent like parts throughout the drawings.

5

Figure 1:
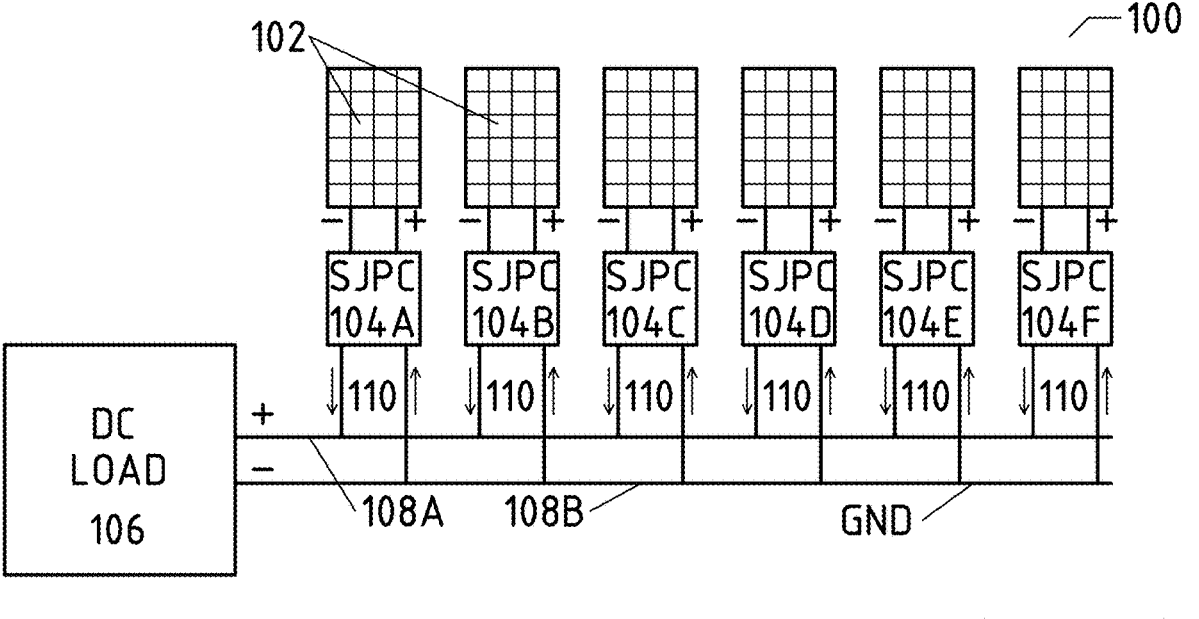
FIG. 1 is a schematic diagram that illustrates six solar panels' outputs connected in parallel to a DC load through switching Joule packet converters (SJPC).

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

Where the disclosure describes "a" or "a first" element (or the equivalent thereof), such description may be considered to include one or more of such elements, without requiring nor excluding two or more such elements. Further, ordinal indicators (e.g., "first," "second," "third," etc.) for identified elements are used to distinguish between the elements, and do not indicate or imply a required or limited number of such elements, nor do they indicate a particular position or order of such elements unless otherwise specifically stated.

As used herein, "optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random-access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events may be considered to occur substantially instantaneously.

Example embodiments may be described as a process depicted as a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function.

Example embodiments may be described in the general context of computer-executable instructions, such as program code, software modules, and/or functional processes, being executed by one or more of the aforementioned circuitry. The program code, software modules, and/or functional processes may include routines, programs, objects, components, data structures, etc., that perform particular tasks or implement particular data types. The program code, software modules, and/or functional processes discussed herein may be implemented using existing hardware in existing communication networks. For example, program code, software modules, and/or functional processes discussed herein may be implemented using existing hardware at existing network elements or control nodes.

The terms "coupled with" and "coupled to" and the like may be used herein. "Coupled" may mean one or more of the following: that two or more elements are in direct physical or electrical contact; that two or more elements indirectly contact each other, but yet still cooperate or interact with each other; and/or that one or more other elements are coupled or connected between the elements that may be coupled with each other. By way of example and not in a limiting sense, "coupled" may mean two or more elements or devices are coupled by electrical connections on a printed circuit board such as a motherboard, and/or two or more computing devices "coupled" on a motherboard or by one or more network linkages. In another non-limiting example, "coupled" may mean two or more elements/devices cooperate and/or interact through one or more network linkages such as wired and/or wireless networks. By way of example and not limitation, a computing apparatus may include.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "interface" or "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer" may describe a physical hardware device capable of sequentially and automatically carrying out a sequence of arithmetic or logical operations, equipped to record/store data on a machine readable medium, and transmit and receive data from one or more other devices in a communications network. A computer may be considered synonymous to, and may hereafter be occasionally referred to, as a computing platform, computing device, etc. The term "computer" may include any type interconnected electronic devices, computer devices, or components thereof. Additionally, the terms "computer system" and/or "system" may refer to various components of a computer that are communicatively coupled with one another, and/or to multiple computer devices and/or multiple computing systems that are communicatively coupled with one another and configured to share computing and/or networking resources.

Examples of "computers" may include cellular phones or smart phones, feature phones, tablet personal computers, wearable computing devices, an autonomous sensors, laptop computers, desktop personal computers, video game consoles, digital media players, handheld messaging devices, personal data assistants, augmented reality devices, server computer devices, cloud computing services/systems, network elements, embedded systems, microcontrollers, control modules, machine-type communications (MTC) devices, machine-to-machine (M2M), Internet of Things (IoT) devices, and/or any other like electronic devices.

As used herein, the term "network" may be considered synonymous to and/or referred to as a networked computer, networking hardware, network equipment, router, switch, hub, bridge, radio network controller, radio access network device, gateway, server, and/or any other like device. The term "network" may describe a physical computing device of a wired or wireless communication network and be configured to host a virtual machine. Furthermore, the term "network" may describe equipment that provides radio baseband functions for data and/or voice connectivity between a network and one or more users.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Joule Counting in a Solar Panel Array
Description FIG. 1

FIG. 1 is a schematic diagram 100 that illustrates six solar panels 102 with outputs connected in parallel to a DC load 106 through switching Joule packet converters (SJPC) 104A-F. Current is from each SJPC is summed with current from the others. Each solar panels' DC outputs are connected to their own SJPC 104A-F. SJPC's outputs are combined in parallel and connected to the DC load 106 through a common DC bus with a positive lead 108A and a negative lead 108B. The DC loads are a power sink that could be a battery charger charging batteries, an inverter connected to AC (mains or grid), or any device consuming DC power. Each positive solar panel 102 lead may be connected to a negative common DC voltage lead 108B inside the SJPC. The SJPCs produce pulses of current 110, which may be filtered with a capacitor (not illustrated) on the DC bus 108A, 108B to remove ripple. Pulses of current usually have variable energy. If one panel has more illumination than others, it will be loaded to a higher MPP and produce a higher energy delivered as pulses. Switching frequencies used by individual SJPCs may by asynchronous or synchronous. If synchronous, a panel 102 producing more power will have a longer pulse width.

If a DC load 106 is a DC-AC inverter, it may connect to a grid or mains and be a grid following inverter. Alternately, the DC-AC inverter may be a grid forming inverter, meaning its output frequency and voltage creates an AC grid.

Each SJPC maintains each solar panel at its maximum power point and adds as much power as possible at the common DC voltage bus 108A, 108B. The pulse width (on time) of the switching transistor in each SJPC independently maintains each solar panel at its MPP. Each SJPC inductor's rate of current rise is proportional to its input voltage and the inductor's rate of current fall depends on a common DC output voltage.

Figure 2:
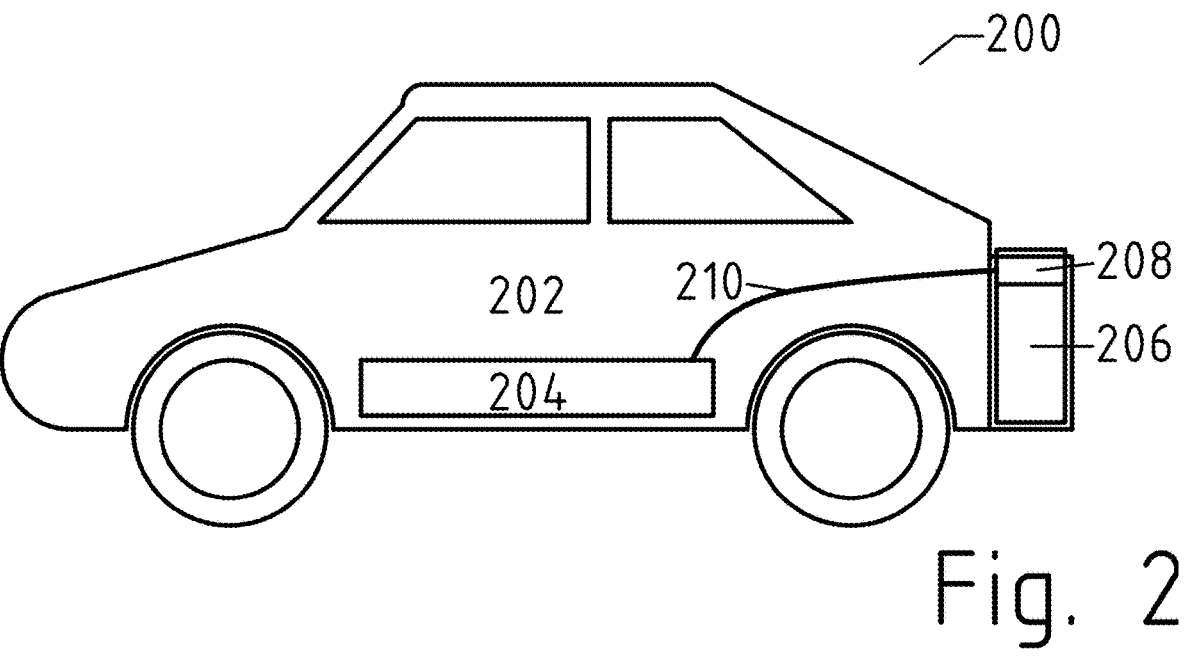
FIG. 2 is a side view of a battery-powered vehicle that has become stranded because its internal battery is discharged.

Additional Joule-Counting Applications
Description FIG. 2

FIG. 2 is a side view (200) of a battery-powered vehicle (202) that has become stranded because its internal battery (204) is discharged. An optional charged reserve battery 206 has been added to a space in the stranded vehicle to get it to a charging station. This battery 206 may be located in a trunk. The reserve battery 206 may have a different operating voltage range than the internal battery 204. For example, the reserve battery 206 may provide 48 volts and the internal battery 204 may provide 800 volts. The reserve battery 206 may have been provided by a police cruiser or tow truck. A SJPC of the present invention 208 connects depleted internal battery 204 with reserve battery 206 via cable 210. The switching power circuit may supply just enough energy to power the vehicle to a charging station or to also charge the internal battery.

Another option is to install reserve battery 206 and SJPC 208 when the car is going on a long trip to extend the range of the vehicle. For local travel, the reserve battery can be removed to decrease the vehicle's weight and have less rolling resistance.

In an alternative embodiment, the space for the reserve battery 206 may be used by a motor-generator running on conventional liquid fuel, where the AC or DC output of the generator is used to supply energy to the main battery through a SJPC 208. If the generator delivers AC power, a full wave bridge circuit can convert the AC to DC. The SJPC can operate for a portion of a full wave cycle while an instantaneous input voltage is above a minimum voltage. As the input voltage rises and falls, a rate of energy packet production can be allowed to change, but each packet can contain a same number of Joules. Thus, packet counting gives an exact measure of energy delivery.

If there is a shorted cell in a battery pack, there is an advantage to delivering an exact number of Joules for charging relative to voltage sensing. A shorted cell will result in the other cells in series being overcharged if voltage sensing is used to stop charging.

Figure 3:
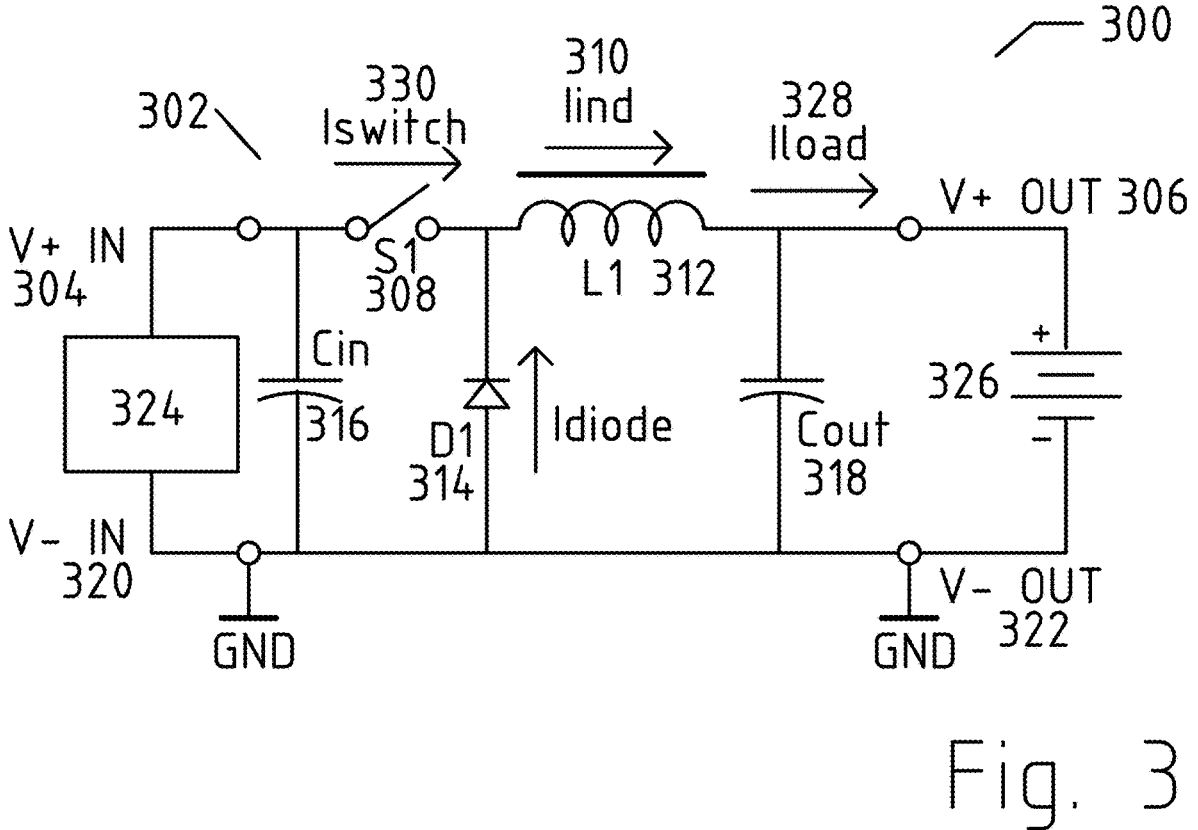
FIG. 3 is a schematic diagram of a Buck DC-DC power converter.

Exemplary Enhanced Converter Architectures
Description FIG. 3

FIG. 3 is a schematic diagram 300 of a Buck DC-DC power converter 302. This Buck regulator circuit is step-down with Vout 306 always being lower than Vin 304. Current flow direction is described as from positive to negative. A solar panel, batteries, wind generator, or other (unregulated) power sources may be used as an input power source 324. The load 326 can be a battery being charged or any other DC power consuming device. Switching transistor S1 308 turns on and a linear current Iind 310 increases in L1 312. After L1 achieves a desired current value, the transistor S1 turns off and L1's current conducts though diode D1 314 and linearly decreases if the output voltage 306 id steady. Capacitors Cin 316 and Cout 318 smooth the DC input and output voltage ripple. The pulse width of the switch 308 is varied by a control circuit (not illustrated) to control the inductor's current which controls power extraction rate from the input supply. This Buck converter has a negative input lead 320 in common with a negative output lead 322. By controlling the maximum inductor current 310 and a switching frequency, power output can be controlled.

In a conventional charging application, a battery may be charged by one or several solar panels as fast as possible and a SJPC circuit can load a solar panel to its MPP. A battery voltage sensor (not illustrated) sends a control signal when it achieves full charge to the SJPC. Next, the SJPCs can optionally go from a pulse width modulation MPP mode into a fixed voltage mode to maintain the battery at full charge. In the float mode, the solar panels will likely not be at their MPP.

The current 310 in said inductor L1 can be measured with a sense resistor (not illustrated) or other means such as a Hall effect magnetic sensor to cause switching with switch 308 at an exact predetermined current 330. If a switching frequency is set, a rate of power transfer will be set. If the number of switch cycles is counted, an accurate energy transfer will be determined. Energy transfer can be used to achieve exact charging or heating without over charging or overheating. The output voltage 306 or the output current 328 can be monitored to make a constant current source or constant voltage source by varying the maximum inductor current and switching frequency.

A number of types of semiconductor switches can be used, depending on the application, voltage and frequency. Lower switch on resistance increases conversion efficiency. Frequently, Schottky diodes or diodes shunted by MOSFETs are used for lower on voltage drop and lower junction capacitance. Low component capacitance also decreases electromagnetic interference when switching.

Figure 4:
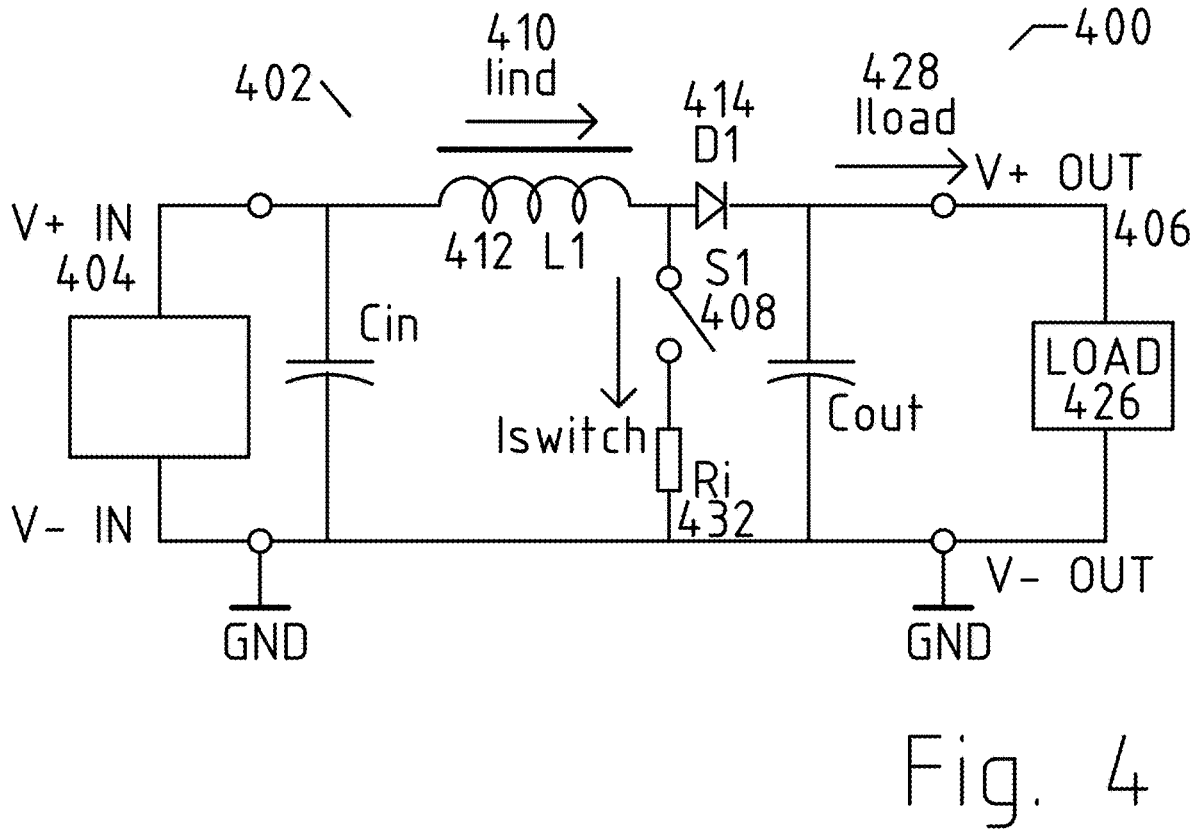
FIG. 4 is a schematic diagram of a Boost DC-DC power converter.

Description FIG. 4

FIG. 4 is a schematic diagram 400 of a Boost DC-DC power converter 402. This regulator steps up its input voltage +Vin 404 to produce a higher output voltage +Vout 406. When transistor S1 408 switches on current, Iind 410 increases linearly in inductor L1 412. When S1 switches off, the inductor current passes through diode D1 414 and Iind 410 linearly decreases if output voltage 406 is steady. This circuit's output voltage Vout 406 is normally higher than Vin 404. Transistor (and inductor current while charging) is sensed by a voltage across a low value resistor Ri 432. A PWM control circuit, not illustrated, can maintain a controlled energy draw from a source, maintaining solar panel at MPP. This Boost converter has a negative input lead connected to a negative output lead. The LOAD 426 can, for example, be a DC-DC converter, a DC-AC inverter, or a battery bank.

In this new application the current 410 in said inductor L1 can be measured with sense resistor 432 or other means, such as a Hall effect magnetic sensor, to cause switching with switch 408 and inductor 410 at an exact predetermined current. If a switching frequency is set, the rate of power transfer will be set by current and inductance. If the number of switch cycles is counted, an accurate energy in Joules transferred will be determined. Energy transfer can be used to achieve exact charging or heating without over charging or overheating. The output voltage 406 or the output current 428 can also be controlled with feedback. Output current 428 or output voltage 406 is monitored to make a constant current source or constant voltage source by varying the maximum inductor current and switching frequency.

Figure 5A:
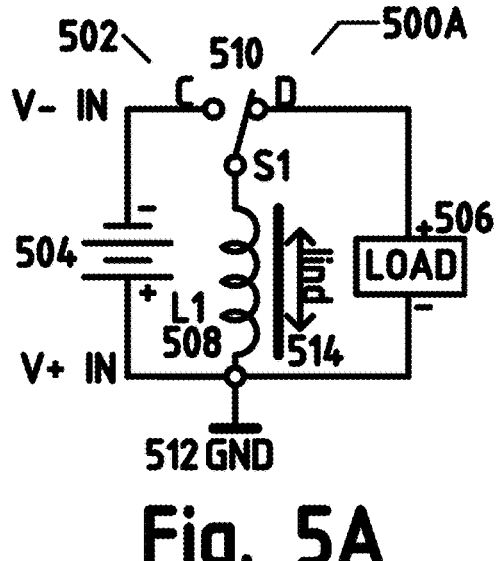
FIG. 5A is a schematic diagram of a simple switching Joule packet converter for transferring energy from a power supply into a load through an inductor.

Description FIG. 5A

FIG. 5A is a schematic diagram 500A of a simple switching Joule Packet converter 502 for transferring energy from a power supply 504 into a load 506 through an inductor 508. FIG. 5A shows the inductor L1 508 being charged by an input voltage and later being discharged into a load 506. At a start of a period, the switch S1 510 is placed into switch position C and current Iind increases, going into L1 508 from ground (GND) 512. After current 514 builds in L1, the switch is instantly switched into position D where current Iind goes into a LOAD 506 while the current Iind 514 decreases. The rate of rise or fall of the current is given by:

$$E = L \cdot dI / dt \tag{Eq. 1}$$

Where E can be the input voltage or the output (LOAD) voltage, assuming it is stabilized by a parallel bypass capacitor (not illustrated). L is the inductance value, and dI/dt is the current's raise of rise or fall.

By adjusting the peak current in L1 508 and keeping the switching frequency constant, a power delivered to the LOAD 506 can be controlled, independent of input voltage, output voltage or load resistance.

After the current Iind goes to zero, the switch can optionally be put into a third "no connection" position (not illustrated). This would be a discontinuous inductor current mode. Alternately, another switching cycle can be started.

Figure 5B:
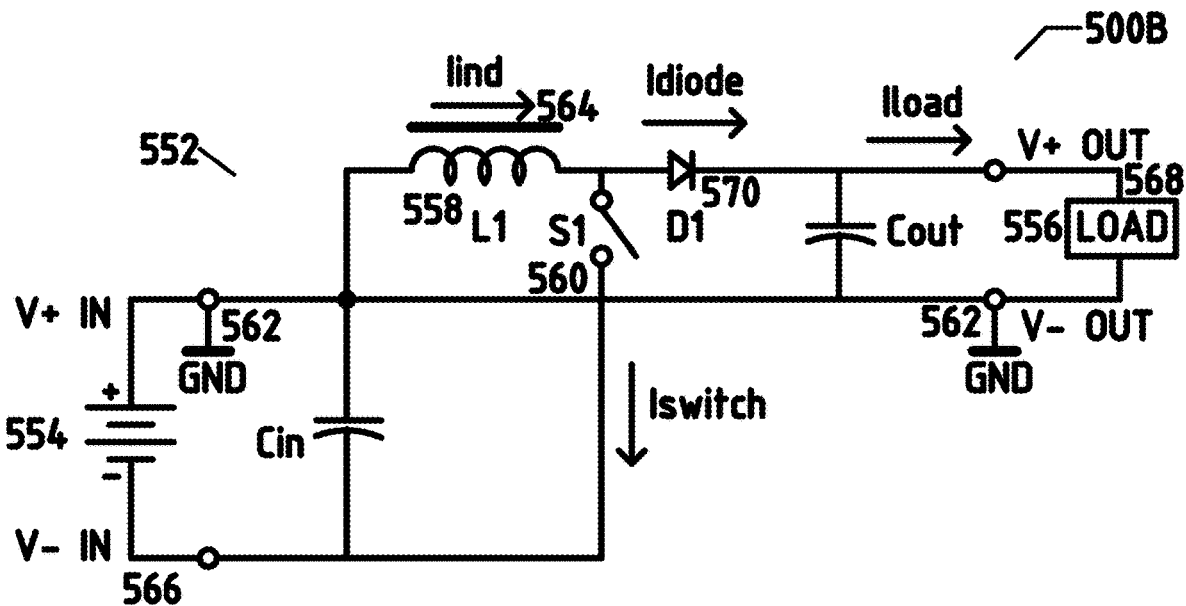
FIG. 5B is a schematic diagram of a Buck-Boost switching Joule packet converter with a positive ground input voltage.

Description FIG. 5B

FIG. 5B is a schematic diagram 500B of a Buck-Boost switching Joule packet converter 552 with a positive ground input voltage 562. This is conceptually the same as FIG. 5A except the switch position C has been replaced by a switch S1 560 and switch position D has been made automatic and replaced by a diode D1 570. Input voltage supply V+ in is connected to ground 562. V− in 566 is supply's negative lead connected to switch S1 560. Input supply ground 562 is also a negative output ground 562 for LOAD 556. Input voltage Vin may be unregulated and Vout 568 may be a fixed or variable controlled voltage source, a controlled current source, or used as a controlled power delivery source. Operation is as follows. Switch S1 560 is closed to linearly charge L1 558 with current 564 while diode D1 570 is back biased (not conducting). After a desired maximum inductor current Iind 564 is reached, S1 560 opens and diode D1 570 conducts. This linearly reduces the current Iind in L1. Capacitors Cin and Cout smooth voltage fluctuations. Switching control is discussed in FIGS. 6-8, and voltage and current flow are illustrated in FIG. 9.

This circuit can be operated in a discontinuous or continuous current mode. In discontinuous mode, the switching frequency is typically periodic (fixed frequency). In continuous mode the switching frequency may be variable. With variable frequency each cycle (pulse) also delivers a same energy.

In discontinuous mode Lind 564 starts with no current, so peak inductor energy Ed is:

$$Ed = \frac{1}{2} L \cdot I^2 \tag{Eq. 2}$$

assuming lossless switching and no component loss. Where I is the peak current and E is energy in Joules delivered per cycle. L is inductance of L1 558. As an example, if L is two micro-Henry and peak inductor current is one ampere, a Joule packet contains one micro-Joule.

Ignoring component losses, delivered power is:

$$Pd = Ed \cdot freq. \tag{Eq. 3}$$

Where delivered power Pd is the Joule packet energy times switching frequency. For example, if the energy packet contains one micro-Joule and the switching frequency (packet rate) is one million packets per second, the power is one Watt.

In continuous current mode energy delivered per cycle is:

$$Ec = \frac{1}{2} L \cdot I2^2 - \frac{1}{2} L \cdot I1^2 \tag{Eq. 4}$$

Where I2 is the maximum inductor current, L is inductance, and I1 is the minimum inductor current and Ec is Joules per cycle.

In discontinuous current mode power is:

$$Pc = Ec \cdot freq \tag{Eq. 5}$$

Where discontinuous power Pc is Joules per cycle times frequency.

This SJPC 552 circuit can function as a constant energy delivery circuit, where the number of watts delivered is the Joule value per cycle multiplied by the switching frequency. That is, if the frequency is fixed a same number of Joules is delivered per second, regardless of the output load's resistance, input voltage Vin or output voltage Vout. This Joule output delivery rate can be set to match an optimal loading point (MPP) for a solar panel that is receiving varying illumination, either by adjusting switching frequency or maximum Iind. Alternately, power delivery can be set for a maximum safe value for a load which could, for example, be a battery or chemical process.

Besides being operated as a controlled energy delivery circuit 552, the circuit also may be operated as a constant voltage source or a constant current source by control of switch S1 560 (transistor) timing using pulse width and/or frequency.

The advantage of the SJPCs 502 and 552 over SJCP 302 and SJPC 402 is that a greater output voltage range can be accommodated, from zero to a very large positive voltage. That said, if a required output voltage 306 never needs to get above the input voltage 304 for SJPC 302, or if a required output voltage 406 never needs to go below the input voltage 404, either circuit can also be used to deliver exact energy using pulse counting. In other words, ignoring component losses, power delivered for SJPCs 502, 552, 302 and 402 is inductance, times one half maximum current squared, times the pulse frequency.

Figure 6:
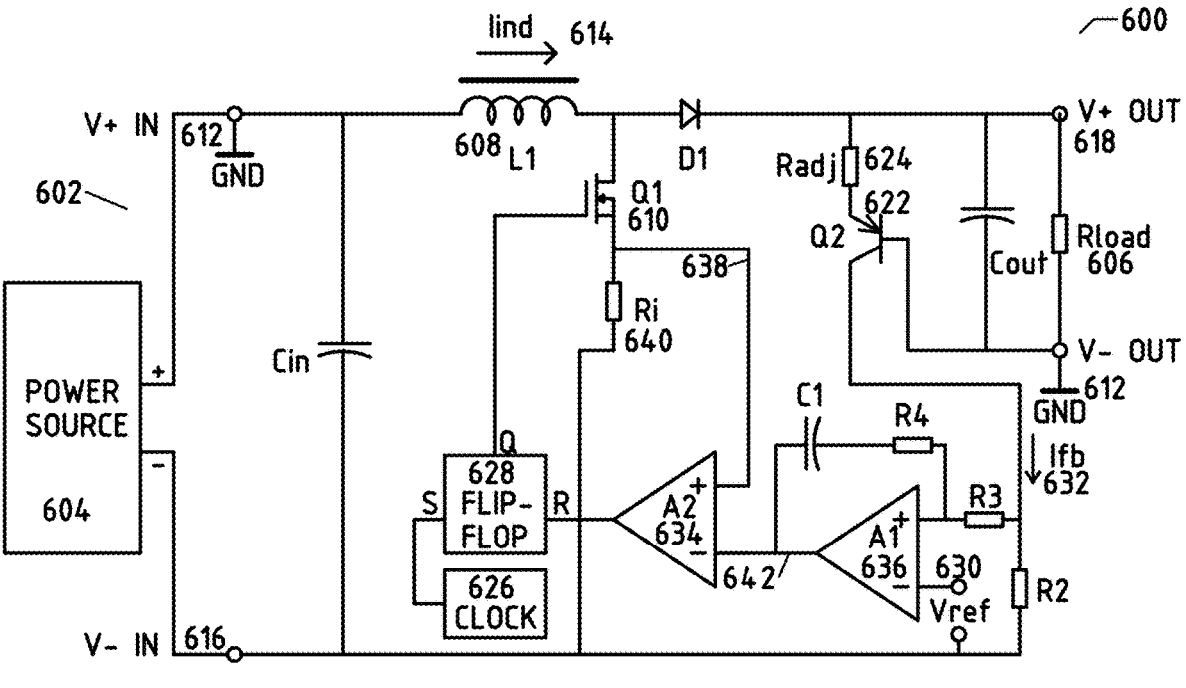
FIG. 6 is a schematic diagram of a switching Joule packet converter with a positive input voltage ground connected to a negative output voltage ground.

Description FIG. 6

FIG. 6 is a schematic diagram 600 of a switching Joule packet converter 602 with a positive input voltage ground 612 connected to a negative output voltage ground, also 612. The input voltage may be supplied by a source 604 such as a solar panel, batteries, thermoelectric generator, fuel cell, hydro or wind generator. The source's 604 positive terminal V+ is connected to ground 612 and the source's 604 negative terminal is connected to V− 616. The output voltage V+ out 618 is delivered with a negative ground (GND) 612 to load 606. This Buck-Boost circuit allows an output voltage to vary between 0 and a maximum voltage which may be determined by design limits, such as safety and component breakdown voltages. Output voltage is regulated by Q2 622 and resistor Radj 624 which determines Ifb 632 through operational amplifiers A1 636 and A2 634. In output voltage control mode, when the output voltage 618 has reached a desired level, collector current flows through Q2 622, to limit the output voltage. The output voltage will be:

$$Vout = Radj \cdot Ifb + 0.7V \qquad \text{(Eq. 6)}$$

Radj 624 can be adjusted to achieve a desired regulated output voltage which can be higher than 0.7 volts. 0.7 volts is the emitter-base voltage drop on Q2 622.

This circuit illustrated operates in discontinuous current mode. A periodic clock (CLOCK) 626 sets a flip-flop 628 which turns on transistor Q1 610. The flip-flop 628 resets when the transistor's Q1 610 current exceeds a threshold voltage 638 on operational amplifier A2 634. When the flip-flop resets Q1 610 turns off. The voltage 638 on sense resistor Ri 640 is proportional to inductor current 614. A threshold voltage 642 is set by the amplifier A1 636 which measures a voltage difference between an input voltage reference Vref 630 and the feedback voltage determined by Ifb 632.

If a fixed voltage at point 642 is applied for a desired maximum inductor current through Ri 640 this SJPC will become a constant power delivery circuit because its switching frequency is fixed.

Figure 7:
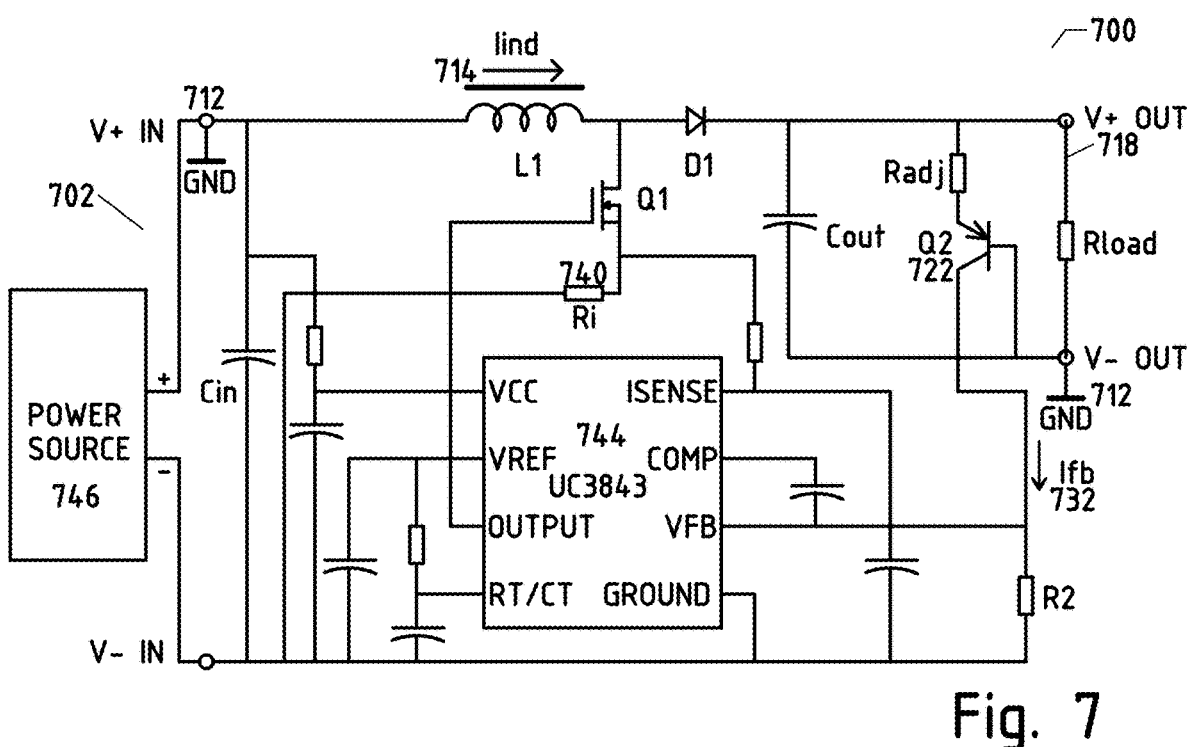
FIG. 7 is a schematic diagram of switching Joule packet converter using a positive ground input and an off-the-shelf integrated circuit.

Description FIG. 7

FIG. 7 is a schematic diagram 700 of switching Joule packet converter 702 using a positive ground input 712 and an off-the-shelf integrated circuit 744. This is a modified Boost-Buck switching regulator using a UC3843 IC 744 for switching control and it is illustrated with output voltage regulation. This circuit also operates in discontinuous mode. This UC3843 IC has multiple vendors, such as Texas Instruments, and the reader is referred to their data sheet for detailed design information. The input power source 746 is connected with its positive terminal connected to ground 712 and the output of the SJPC has a negative ground at its output, also 712. Again, when a desired voltage Vout 718 is reached, transistor Q2 722 produces a collector current Ifb 732 which provides a voltage to be controlled on input VFB. Control feedback is done by varying an OUTPUT IC 744 pin's pulse width. Inductor current 714 is set by the current through sense resistor Ri 740 reaching a threshold value.

The UC3843 IC can also be used for constant power delivery to a load. It can be rewired so that when the maximum inductor current 714 produces 1.0 volt across lead ISENSE, a transistor switch Q1 is turned off. Unfortunately, the 1.0 volt threshold voltage is not adjustable for the UC3843.

Figure 8:
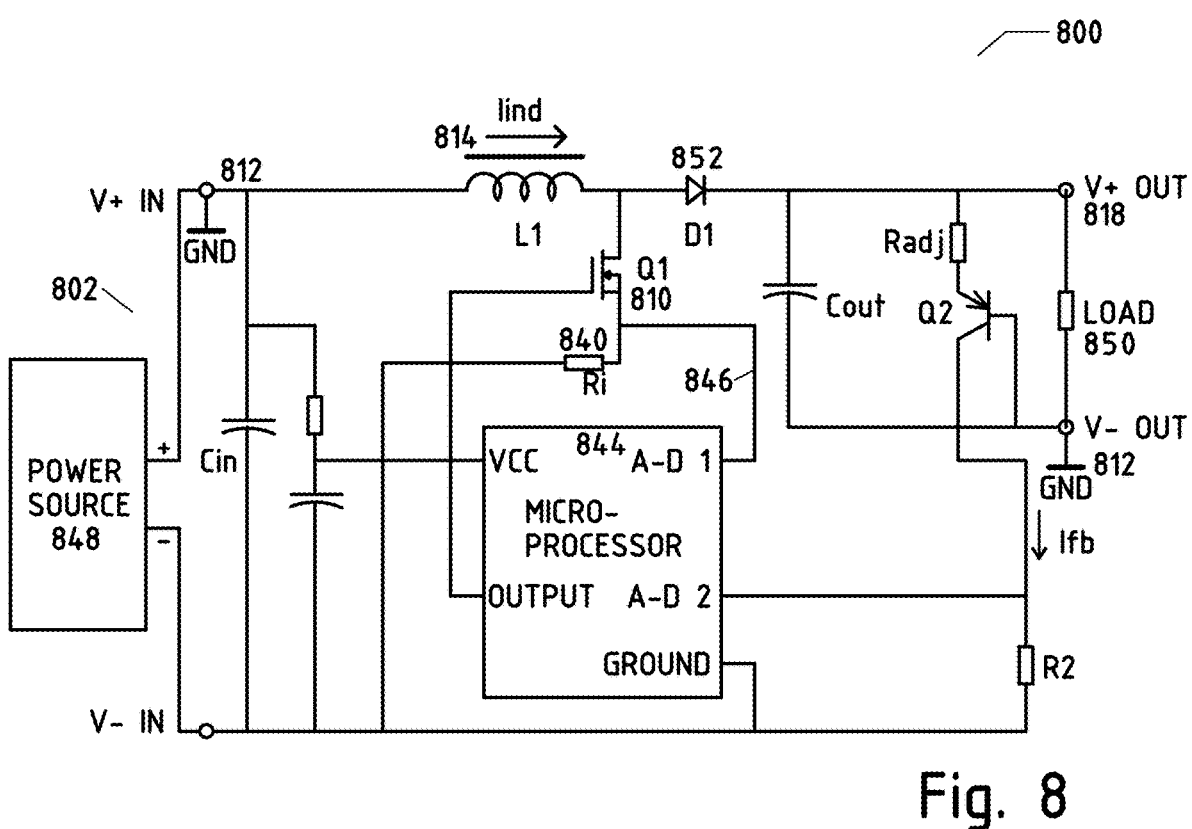
FIG. 8 Is a schematic of a Buck-Boost switching Joule packet converter controlled by a microprocessor.
Figure 9:
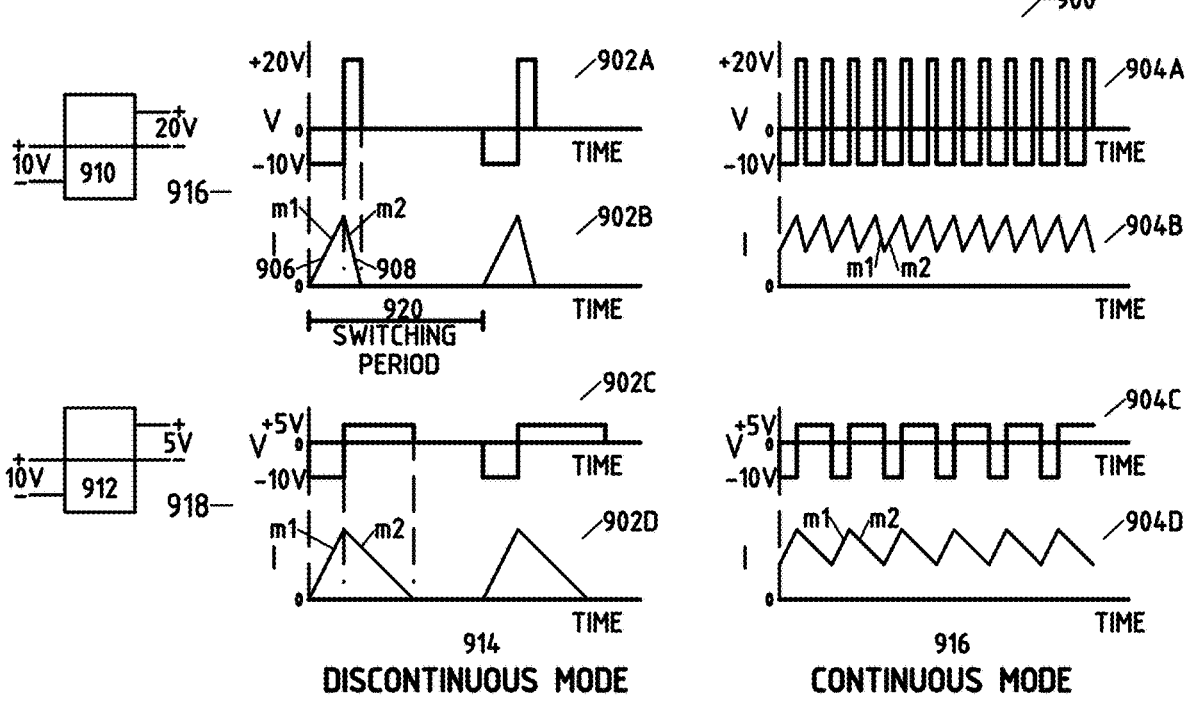
FIG. 9 is a set of plots of voltage and current vs. time for continuous and discontinuous switching modes.

Description FIG. 8

FIG. 8 Is a schematic 800 of a Buck-Boost switching Joule packet converter 802 controlled by a microprocessor 844. The Buck-Boost SJPC 802 circuit uses a positive input GND 812 which has a same potential as negative output ground 812 because they are connected. The input power source 848 can be a solar panel or other source of power. The microprocessor 844 controls the transistor switch Q1 810 pulse width via OUTPUT pin to produce a controlled maximum inductor current 814 in L1. Pulse width control and frequency setting is done by incrementing and decrementing counters inside the microprocessor. If the pulse width is too short, the solar panel 848 will be under-loaded. If the pulse is too long the solar panel will be overloaded and its output voltage will sag, also reducing power. The optimal pulse width will achieve the MPP, and that depends on the solar panel's illumination level.

When the switching frequency is fixed and operation is discontinuous, a maximum power transfer point occurs when Ed peak energy is at a maximum, as given by equation (2). Power out of the switching circuit Pd will be given by equation (3) which is Ed times switching frequency. This does not include switching losses or component losses, which should be well known and repeatable.

If the operation is continuous switching frequency will be variable and the, maximum switching energy Ec will be given by equation (4). Maximum power Pc is maximum energy Ec times the switching frequency, given in equation (5).

One can also have fixed frequency and continuous operation, but a maximum current will need to vary if the power of a source or a load changes. Accordingly, packet energy will not be fixed.

The microprocessor 844 has a power source Vcc and GROUND. The OUTPUT lead drives the gate of the switching transistor Q1 810. Analog to digital converter 1 (A-D 1) measures the instantaneous Q1 current across Ri 840 which is proportional to voltage 846. Microprocessor input/output buffering circuits are not illustrated. A-D converters may be built into a microprocessor or external and placed onto a common bus with the microprocessor. A microprocessor such as an Espressif ESP32 can work, although a 32 bit processor might be considered to be too capable. It has features such as Wi-Fi communications which could be used for power monitoring, network power control, and fault detection. A lower cost 8-bit microprocessor can alternatively be used.

Figure 11:
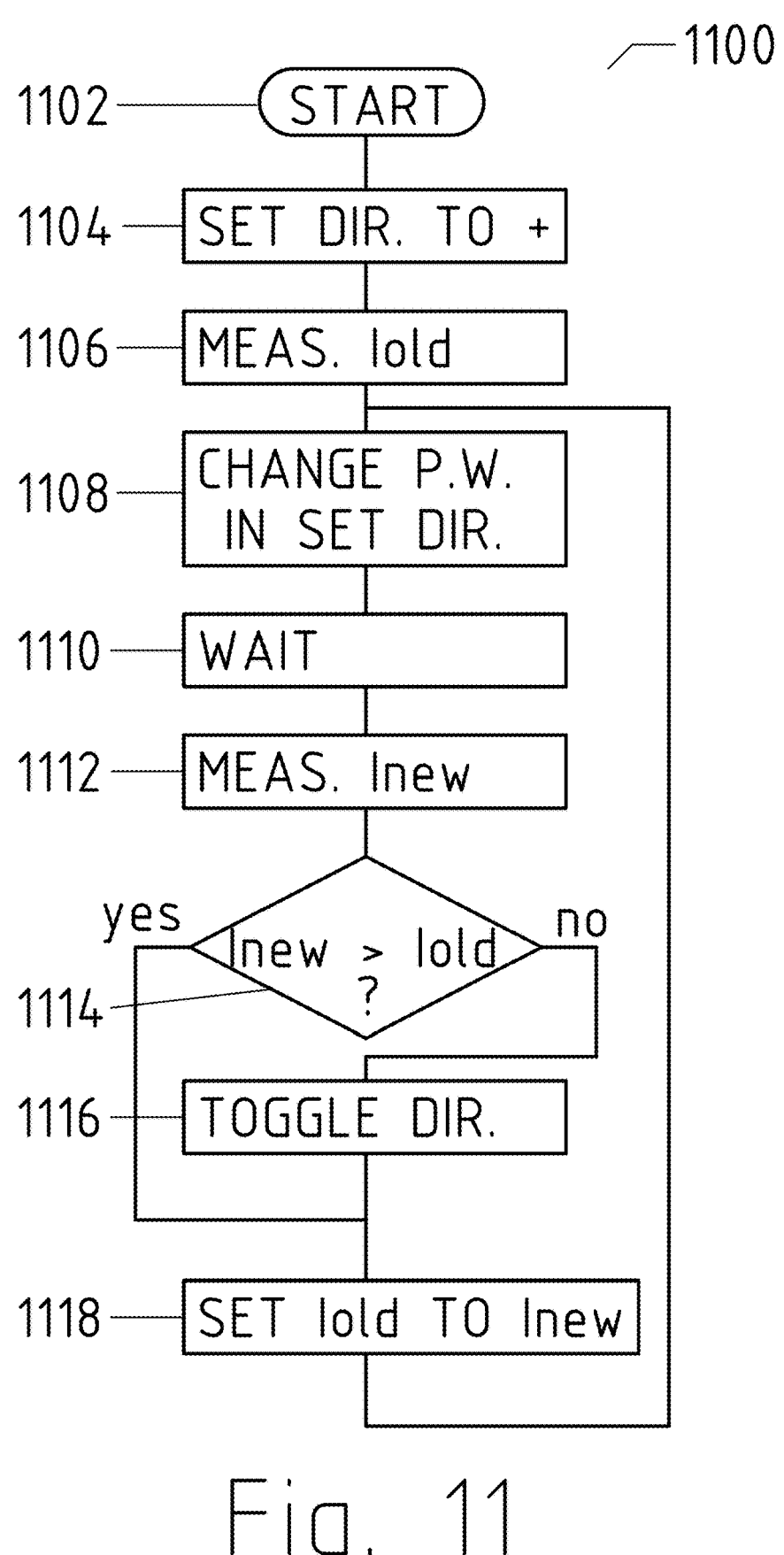
FIG. 11 is a flow diagram for maintaining optimal loading (MPP) on a solar panel.

Analog to digital converter 2 (A-D 2) optionally measures an output over-voltage condition and causes the microprocessor to shut down the transistor Q1 810. Alternately A-D 2 can be used to regulate the output voltage 818 if a regulated voltage is needed instead of a controlled power output. If the output voltage gets too high, the voltage V+ out 818 exceeds a threshold value. This could happen, for example, if there was no load on the power supply. A flow diagram is illustrated in FIG. 11.

Instead of using a microprocessor, Q1 switching can be controlled by a custom integrated circuit (application specific IC) or a programmable logic IC. Again, in discontinuous mode the pulse width determines the maximum inductor current, which determines how many Joules of energy are delivered per cycle. In continuous mode, the pulse width determines an increase of inductor energy, which determines how many Joules of energy are delivered per cycle. In continuous mode a set maximum inductor current turns on the transistor Q1 810 and a set minimum inductor current turns Q1 off. Thus, power extraction from a source can be precisely controlled. The microprocessor 844 can also count a number of switching cycles (Joule packets), which can determine the energy delivered to a load LOAD 850.

In an alternative embodiment, an ideal diode IC such as a LTC4358 can be used to reduce the power loss in Schottky diodes, such as D1. The IC turns on a Field Effect Transistor with low internal resistance, shunting the Schottky diode D1 852.

Exemplary Results
Description FIG. 9

FIG. 9 is a set of plots 900 of voltage and current vs. time for discontinuous and continuous switching circuits. FIG. 9 has a set of four example curves. A top row 916 of plots illustrates an output voltage greater than an input voltage. A bottom row 918 of plots illustrates an output voltage less than the input voltage. Diagram 910 shows negative 10 volts in and positive 20 volts out and a positive input ground connected to a negative output ground. Diagram 912 shows a negative 10 volts in and a positive 5 volts out.

Inductor voltage 902A and inductor current 902B vs. time for discontinuous mode 914 are on a top left side. Inductor voltage 902C and inductor current 902D vs. time for discontinuous mode 914 are on a lower left side. Inductor voltage 904A and inductor current 904B vs. time for continuous mode 916 are on a top right side. Inductor voltage 904C and inductor current 904D vs. time for continuous mode 916 are on a lower right side.

Inductor voltage 902A and inductor current 902B in discontinuous mode can apply to the Boost SJPC circuit (e.g., FIG. 4) or Buck-Boost SJPC circuits, such as FIG. 5A-5B. The upper row, 902A, 902B, 904A and 904B, are examples of 10 volts input and an of 20 volts output, which is step-up voltage switching. The lower row 902C, 902D, 904C and 904D are examples of 10 volts input and 5 volts output, which is step-down voltage switching which can be done by Buck (e.g., FIG. 3) or Buck-Boost circuits such as FIG. 5A-5B. Switching transistor on resistance, switching losses, inductor losses and diode voltage drop are all assumed to be zero for analysis. A rate of rise and fall of inductor current flow is voltage across the inductor divided by inductor's inductance value. When inductor current is rising the slope "m1" 906 (typ.) is 10 volt input voltage/inductance. When the current is falling, the slope "m2" 908 (typ.) is the output voltage (5v or 20v) divided by inductance. With a higher output voltage relative to input voltage, the rate of inductor current decrease will be faster than the rate of current increase.

Figure 10:
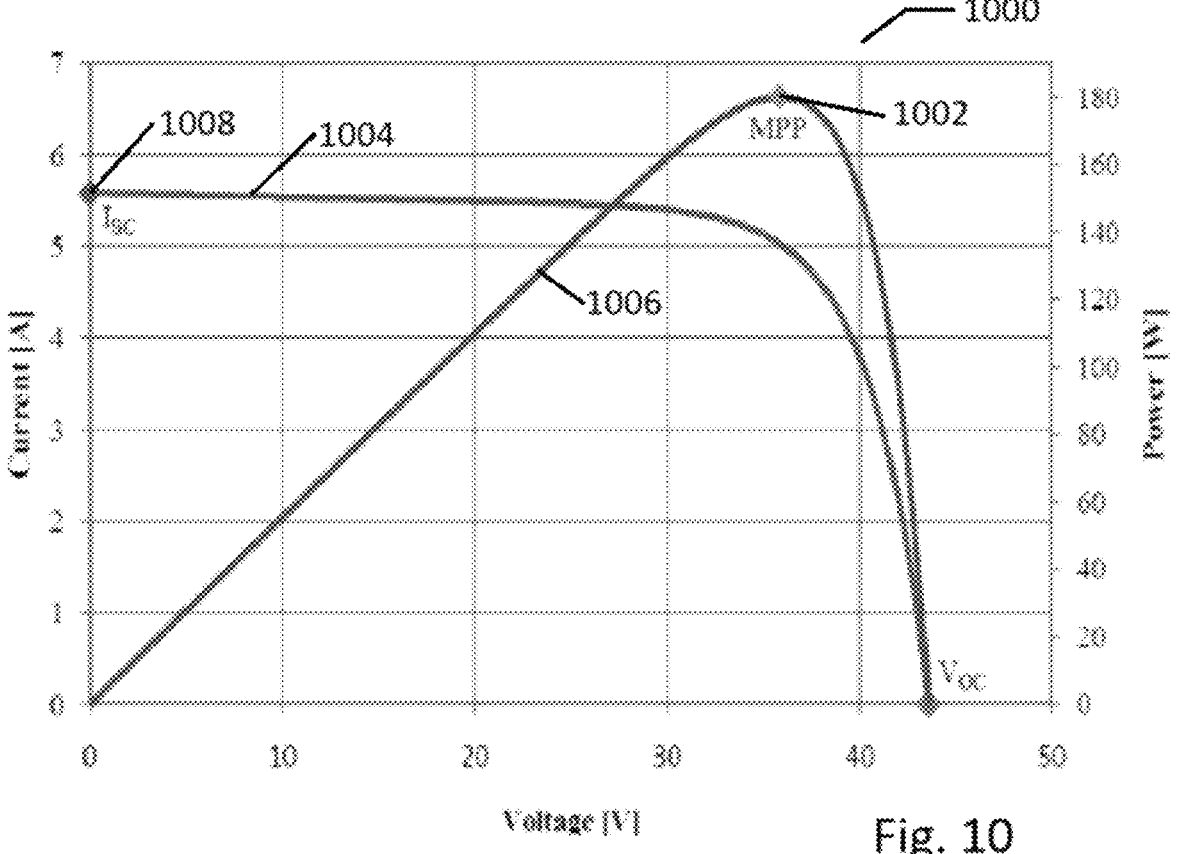
FIG. 10 is a solar panel's voltage vs. current plots illustrating a maximum power point (MPP).

Description FIG. 10

FIG. 10 is a solar panel's voltage vs. current plots 1000 illustrating a maximum power point (MPP) 1002. FIG. 10 shows a highest power output operating point MPP for a solar panel that occurs with a given illumination. Silicon solar cells produce about 0.6 volts per element and are connected in series to increase the voltage. A silicon cell's voltage changes −2 mV per degree Celsius, so temperature also influences MPP. A current curve 1004 decreases with increased output voltage. Isc 1008 is short circuit current. A voltage curve is 1006. DC output voltage times DC current is output power. Voltage curve 1006 has a maximum power point (MPP) 1002. The MPP's voltage will be similar, but not identical for different solar panels which are connected in parallel. Thus, a fixed load voltage for all panels will not produce maximum power. It is a goal of this invention to maintain output loading at MPP for each solar panel for an array of solar panels.

Exemplary Solar Panel Loading
Description FIG. 11

FIG. 11 is a flow diagram 1100 for maintaining optimal loading (MPP) on a solar panel. This diagram is described for discontinuous mode switching, but can be modified for continuous mode switching. This flow diagram constantly hunts for a maximum possible inductor current by adjusting transistor pulse width. In a first step 1102 the process starts and pulse width (transistor switch on time) is set to a low value. In a second step 1104 the direction of pulse width increase is set to increase (+). In a third step 1106 a maximum inductor current is measured and stored as Iold. In a fourth step 1108 the transistor is switched on for its previous pulse width duration plus or minus a delta time value (count). Increment if direction is plus and decrement if direction is minus. The delta time value in microseconds may be arbitrary and may have coarse or fine steps. In a fifth step 1110 there is a time delay to allow circuit settling. A-D 1 in microprocessor 844 measures current (giving inductor power) at the end of a pulse. In a sixth step 1112 the peak current I of the inductor is measured and stored as Inew. In a seventh step 1114, if the peak new inductor current is greater than the old (previous) peak current, the direction (increment or decrement the counter) is kept the same. In an eight step 1116, if the new peak current is less than the previous peak current, the count direction is toggled. That is, if it was positive, it is now made negative. If it was negative, it is made positive. In a ninth step 1118 the Iold current value is set to the Inew current value. Processing loops back to step 1108 where it is repeated in an endless loop. When the sun goes down, an under voltage lockout stops control pulses to the gate of the transistor and the process stops. Under voltage can be determined by pulse width becoming too long to establish a minimum inductor current, or other means, such as a third A-D converter (not illustrated) connected to the input voltage power supply, or the microprocessor shuts down in a Q1-off mode. When the sun rises, the process restarts from step one 1102.

This circuit constantly hunts for a peak inductor current. The maximum current will vary with the illumination level. Other methods of MPP are discussed in the literature and can be used as well.

In continuous mode, the maximum current is replaced by the delta current energy as described in Eq. 4.

Hybrid Solar Panel and Converter Array

In some embodiments, it is desirable to be able to integrate solar panels generating less relative power (e.g., lower light conditions) with conventional solar power arrays, where each panel in the conventional array produces the same relative power output as other panels in the conventional array. Conventionally, the energy from lower-power-producing panels in an array may be excluded from a receiving controller or sink, thereby wasting valuable energy that is produced, even at lower levels. The following embodiments describe exemplary techniques for integrating a variety of different power-producing solar panels into a single hybrid system, and without a need for materially reconfiguring conventional solar panel architectures that may already be in place. In an exemplary embodiment, a number of additional solar panels may be integrated with conventional solar panels/architectures through implementation of the innovative voltage limiting SJPC (e.g., SPJC 104, FIG. 1). Other non-solar energy generating devices, such as wind generators, hydro-power and thermoelectric devices may be combined with solar panel power using the SJPC.

Figure 12:
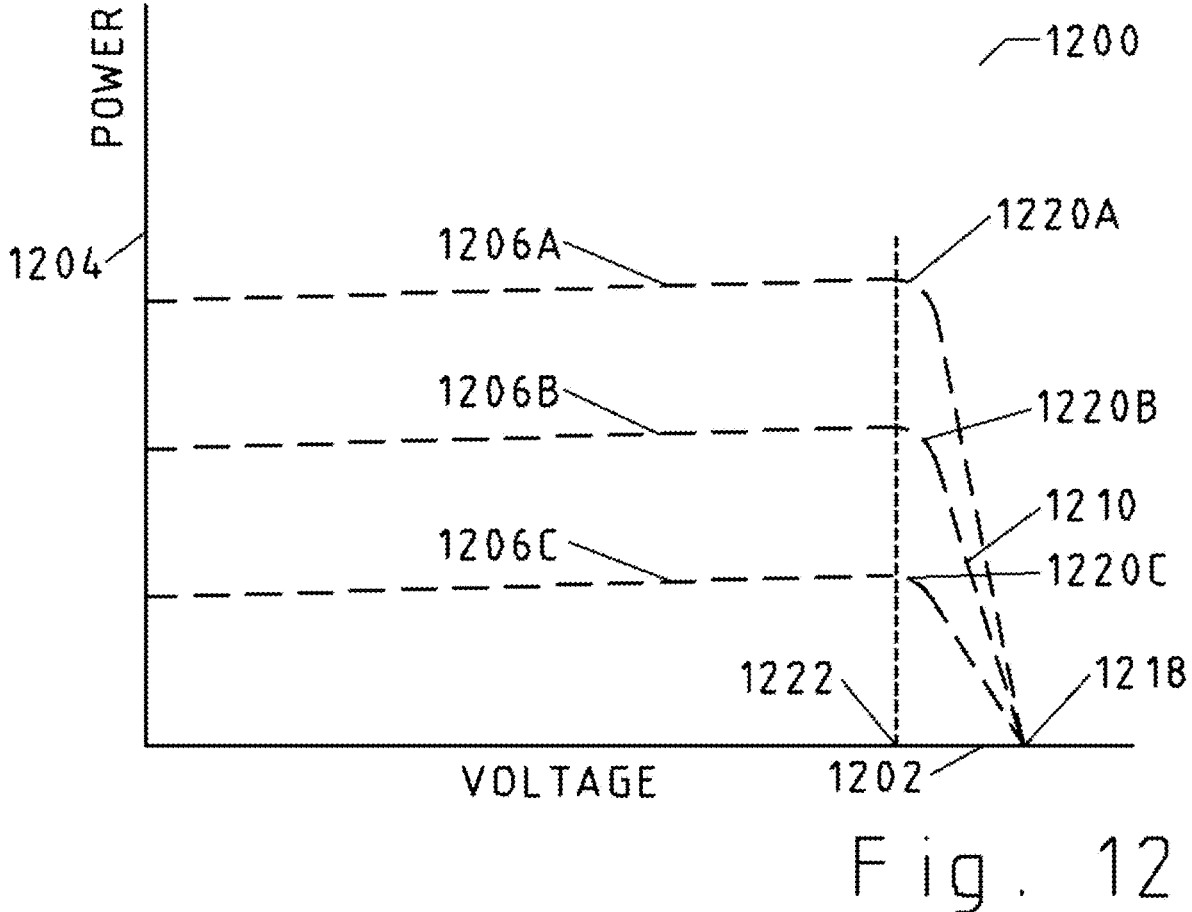
FIG. 12 is a set of plots of voltage vs. power for a voltage limited SJPC.

Description FIG. 12

FIG. 12 is a set of plots 1200 of voltage vs. power for a voltage limited SJPC. The vertical axis 1204 is power and the horizontal axis 1202 is voltage. Power at every operating point is a product of voltage times current. Three plots correspond to solar panels with high illumination 1206A, medium illumination 1206B, and low illumination 1206C. Note that SJPC power output is relatively independent of delivered voltage for a given illumination level. There is a need to limit an output voltage of a SJPC for operational reasons, such as safety and component breakdown. Because an output voltage of a SJPC is a rate of current change vs. time multiplied by inductance, the SJPC output voltage is not practically limited. The SJPC output voltage could be limited, for example, by dumping its power into a voltage limiting device, such as a high power Zener diode. But better solutions exist, such as reducing the SJPC switching frequency or switching pulse width.

The SJPC plots 1206A-C may have a slight up slope on the left side of the plots because a SJPC can deliver slightly more power at higher voltage. This higher SJPC power output at higher voltages is due to resistive losses in connecting cables being lower, because at higher output voltage, current is lower. At knee points 1220A-C, increasing output voltage results in reduced power output. Knee voltage point 1222 is a threshold output voltage for all illumination level plots. A SJPC circuit detects a knee voltage has been reached at knee voltage point 1222 and tapers 1210 power output to reach 0 volts and 0 watts at maximum voltage point 1218. This tapering 1210 can be done by controlling switching pulse width or switching frequency. An exemplary solar panel array implementing these principles is described further below with respect to FIG. 13.

Figure 13:
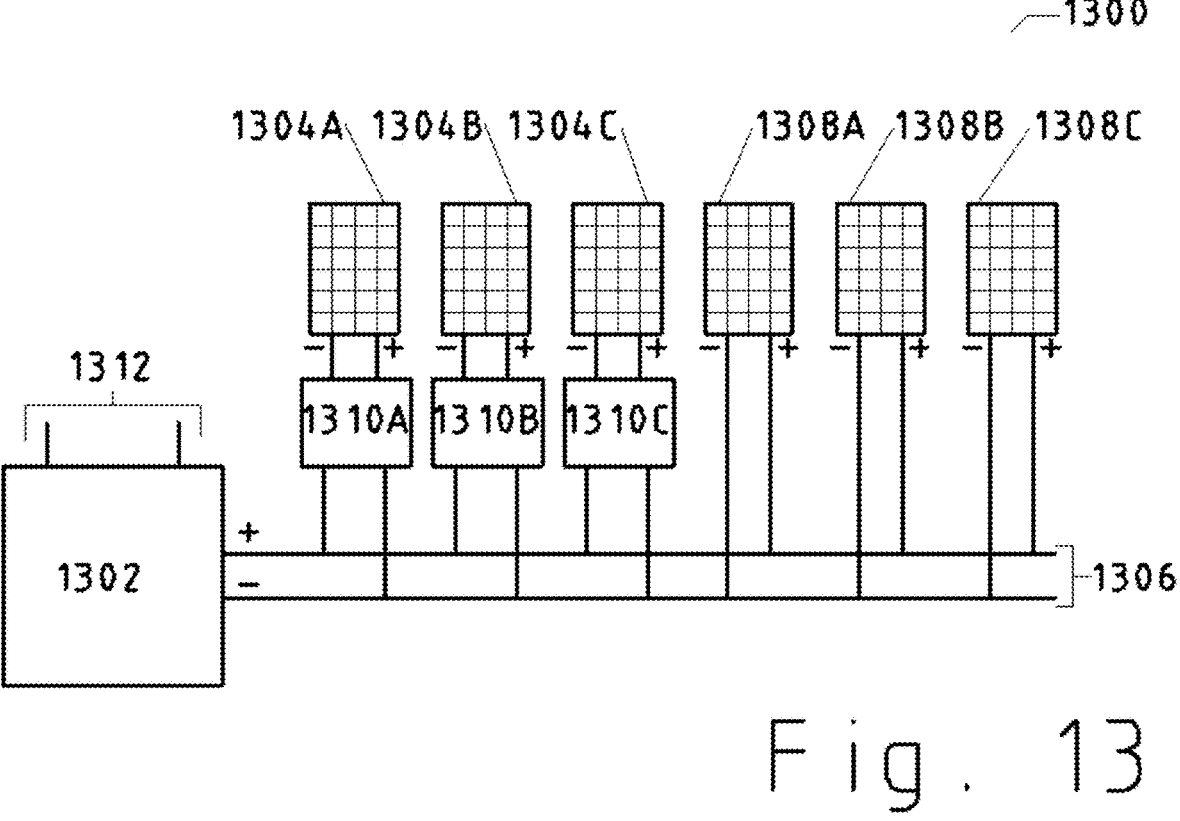
FIG. 13 is a block diagram of solar panels and SJPCs connected in parallel to a converter device.

Description FIG. 13

FIG. 13 is a schematic diagram illustrating a hybrid system 1300 of solar panels 1308A-C and SJPCs 1310A-C with outputs connected in parallel to a converter device 1302. Converter device 1302 could be a grid tie inverter, a battery charger, a grid forming inverter not grid tied, or other device. Converter device 1302 has output connections 1312 which can be DC, AC, or multi-phase AC. Directly connected to a DC bus 1306 of device 1302 are the solar panels 1308A-C which could be similarly illuminated. Also connected to the DC bus 1306 of device 1302 are outputs of the SJPCs 1310A, 1310B and 1310C. Indirectly connected solar panels 1304A-C are connected to inputs of SJPCs 1310A-C. Solar panels 1304A-C could each be exposed to different solar irradiation, such as 1304A exposed to a rising sun, 1304B exposed to a setting sun, and 1304C exposed to scattered light. The outputs of directly connected solar panels 1308A-C are connected in parallel with the DC outputs of SJPCs, each of which is connected to its respective solar panel 1304A-C.

Thus, the converter device 1302 accommodates both the directly connected solar panels 1308A-C and the indirectly connected solar panels 1304A-C, which connect through SJPCs 1310A-C. The directly connected panels 1308A-C with similar illumination can be maintained at MPP by device 1302 (e.g., using a switching controller for a solar energy array/system), and indirectly connected solar panels 1304A-C are individually all maintained at MPP by their respective SJPCs.

In alternative embodiments, either more or less directly or indirectly connected solar panels can be connected, or the converter device 1302 can operate with all directly connected solar panels or with all indirectly connected solar panels using SJPCs.

In another alternative embodiment, directly connected solar panels can be connected in series forming a string, and the SJPCs outputs can be connected in parallel with the string of series connected solar panels.

In yet another embodiment, two solar panels with similar illumination can share a single SJPC.

It is assumed in FIG. 13 that SJPCs 1310 may utilize a boost circuit to step-up the input voltage; however, a buck-boost or a buck circuit can alternately be used to maximize efficiency.

This use of voltage limiting SJCPs 1310, in parallel with individual solar panels 1308, make this embodiment safer than a conventional series connection of many solar panels which can produce hundreds of volts. For example, the solar panels 1308 might have a maximum output voltage of 36 volts DC.

Furthermore, solar panels 1304A-C may have different voltage and current ratings than solar panels 1308A-C. In an exemplary embodiment, the principles described herein may be of particular utility for bi-facial solar panels, where one panel side may be generally positioned vertically to face the sun, and where the other panel side may face away from the sun (e.g., facing toward a light-colored or mirrored structure that reflects the sun's light).

The systems and methods herein are also of value to conventional solar energy systems where individual panels in an array may degrade over time, such as in the case where direct sunlight is known to eat away at the panel material functionality over time. Different panels in the array may continue to operate, but no longer at the generally same output voltages/power levels. Implementation of one or more of the present innovative SPJCs on one such degraded panel would enable that panel to continue to provide energy at its maximum capacity, even if substantially less than the energy from accompanying panels.

This architecture also works to combine different power sources. For example, indirect solar panels 1304A-C could be replaced by batteries, thermo-electric generators, fuel cells, hydro or wind generators using SJPCs for power conversion, and all having the feature of voltage limiting.

Exemplary power output results from hybrid system 1300 are described further below with respect to FIG. 14.

Figure 14:
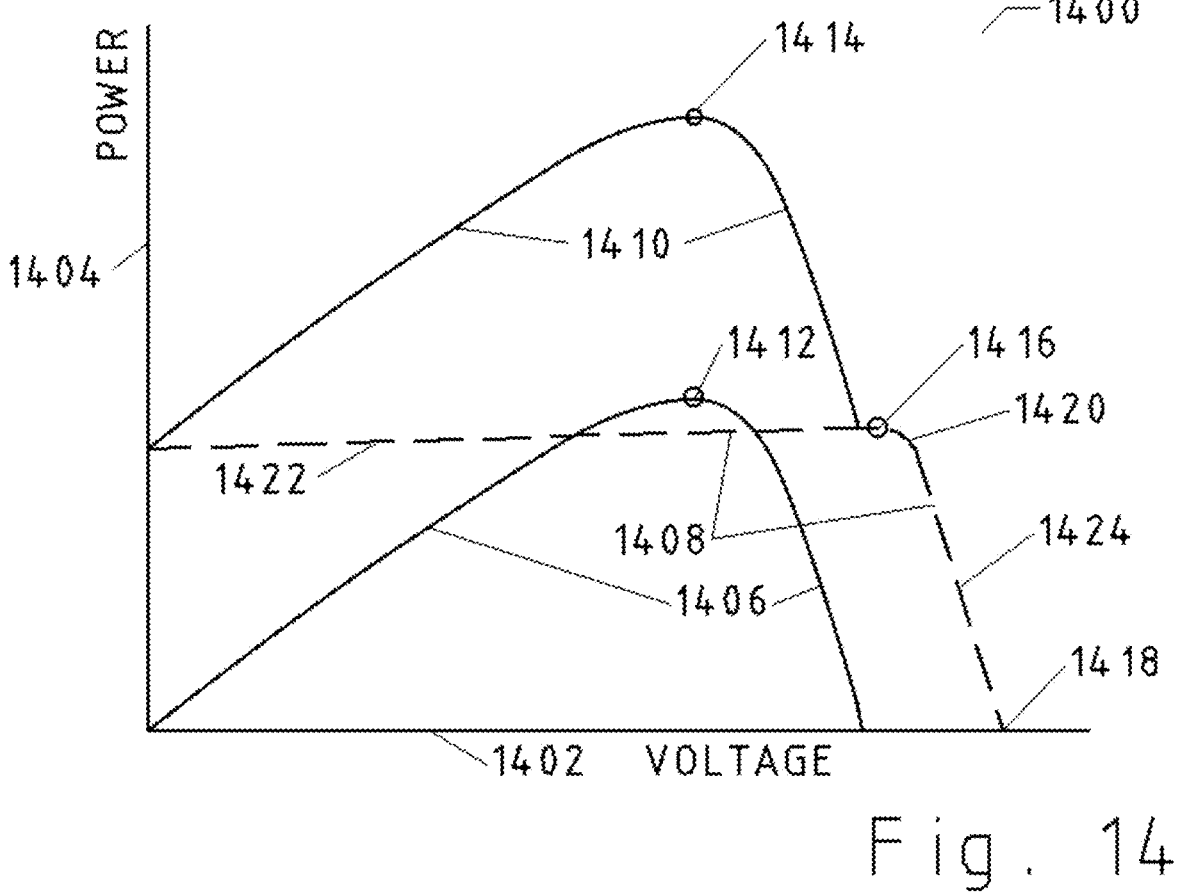
FIG. 14 is a set of plots of voltage vs. power for parallel connected inputs to a converter device.

Description FIG. 14

FIG. 14 is a set of plots 1400 of voltage vs. power for parallel connected inputs to a converter device 1302. The vertical axis 1404 is power and the horizontal axis 1402 is voltage. Power at every operating point is a product of voltage times current. A first plot 1406 is for a single or multiple directly connected solar panels with similar illumination. This plot is similar to the power curve in FIG. 10. Plot 1406 has a direct MPP 1412. A second plot 1408, illustrated a with dashed line, is for a voltage limited SJPC, such as SJPC 1310A. The second plot has an indirect MPP 1416. The SJPC's output plot may have a slight up slope 1422 on the left side of the plot because a SJPC can deliver slightly more power at higher voltage due to lower line losses. A third combined plot 1410 is a power vs. voltage plot for both SJPC outputs and solar panel outputs when connected in parallel. DC currents add when solar panels 1308A-C and SJPC devices 1310A-C are connected in parallel. That is, power values in plots 1406 and 1408 are added to make the combined plot 1410.

In the case where a device, such as the converter device 1302, was trying to extract maximum power from only the solar panel(s) 1304, the operating point would be at MPP point 1412. If, on the other hand, the device 1302 was trying to extract maximum power from one or more SJPCs 1310, the indirect MPP would be point 1416. Accordingly, in the case where the converter device 1302, using a peak power searching algorithm, was trying to extract maximum power from the voltage limited SJPCs 1310 connected in parallel with the solar panels 1308, the combined plot 1410 would have a combined MPP 1414. Thus, converter devices 1302, hunting for direct MPP at point 1412 with just solar panels, could also converge on a combined MPP 1414, when both solar panels 1308 and SJPCs 1310 are connected in parallel with their respective currents combined.

As mentioned previously, it may be desirable to limit an SJPC 1310 from exceeding a maximum output voltage limit 1418 because converter devices will typically have a maximum rated input voltage. With just solar panels, this peak voltage is limited by physics. An SJPC-over-voltage condition can happen when the sun is bright, the converter device 1302 is using low power, or when a power utility receiving the device's power decides it cannot receive any more power. The plot 1408 for the SJPC has an inflection voltage at a knee 1420 where the SJPC tapers 1424 the Joule delivery rate as output voltage increases. From the knee 1420 it tapers to zero current at a maximum voltage 1418. This current/voltage tapering can be done by limiting the peak current through the inductor (by reducing pulse width) or dropping the switching frequency. A controlling microprocessor can produce a tapering, or it can be done by an analog or digital circuit.

Utilizing one or more of the aforementioned techniques, the knee 1420 may be placed on plot 1408 to form an indirect MPP 1416.

Thus, SJPCs can be connected in parallel with one or more solar panels and still operate at a composite MPP. An over voltage protection feature can be added to the SJPC to reduce voltage and power when a receiving load cannot accept higher power or voltage.

When an SJPC is supplied power by an alternate energy collecting device, such as a wind or hydro generator, the SJPC output voltage can also be limited or tapered.
Graphing of Energy Collected Vs. Time For diagnostic purposes, a record of how much energy each SJPC collected versus time is frequently required. This information may be collected by the SJPC and presented in graph format, or downloaded as a spreadsheet or table. Each reported time period (e.g., 24 hours), has a number of time samples. Each time sample has an associated joule value. As an example, a time sample, may contain energy delivery for one minute. Each minute's energy is a sum of energy delivered in multiple sub-time periods, each of which may be a switching period (e.g., element 920, FIG. 9, above). For example, a 24 hour reported time periods could contain 1440 (=60×24) time samples of one minute, each with a sum of energy values for 1,200,000 (=60×20000) sub-time periods which could be 50 microseconds. For each sub-time period, a maximum, inductor current value is squared and added to an accumulated value associated with the reported 1 minute time period. Scaling of one half of the inductor's value is applied.

Joule counting may also be incorporated for precise energy delivery. For example, 3600 joules (a watt hour) may be required to recharge a fully discharged battery. At the end of the 3600 joule delivery, charging is stopped. Note than in bright sunlight, the charging may be completed sooner than in dim sunlight.

Systems and methods according to the present embodiments thus realize significant advantages over conventional techniques with respect to solar panels systems, whether though the power-combining principles described above with respect to FIGS. 12 through 14, or according to the joule counting principles of FIGS. 1 through 11, the. Additionally, the MPP tracking techniques described herein may be particularly advantageous in the case where the number of joules in a packet may not be uniform. In such cases, a microprocessor of one or more of the present controller embodiments may be further configured to generate or graph a histogram of energy packets delivered or received over time to capture a total energy value as the area (i.e., an integral) of the histogram plot.
Additional Applications for New Conversion Techniques In some embodiments, one or more of the above-described SJPCs may use isolation between its respective input and output. For example, such isolation can be achieved by opto-isolators or isolated transformer windings. In another example, flyback switchers may have isolation.

In some embodiments, SJPCs may combine solar panels outputs that have dissimilar output voltages, such as 18 and 36 volts. This idea may be incorporated into a home grid with batteries, wind, hydro, etc. For example, this type of SJPC can drive a string of Light Emitting Diodes (LEDs) as a load (or other light-producing destination sinks). In such cases, the SJPC design may be advantageously configured to protect the operating LEDs/lights from over-current damage.

In some embodiments, a DC/AC inverter may make more phases than single phase, such as three phase. Other AC output inverters, such as Enphase units, can be combined with the DC/AC inverters of the present disclosure. DC/AC inverter output leads 1312 can be placed across the Enphase AC leads.

In an exemplary embodiment, bypass capacitors may be disposed at the input and output of SJPCs to reduce electromagnetic interference. In other embodiments, similar circuit functionality may be obtained by reversing the polarity on the power supplies and loads, reverse all diode connections, replace NPN transistors with PNP transistors, etc.

When an inductor dumps all its energy into a capacitor, the capacitor's energy, Ecap, is:

$$\frac{1}{2}C \cdot V^2 = Ecap = Eind = \frac{1}{2}L \cdot I^2 \qquad \text{(Eq. 7)}$$

Bypass capacitors should have small impedance at the switching frequency.

In some cases, Insulated-Gate Bipolar Transistors (IGBT), SiC (silicon carbide), and power BJT (Bipolar Junction Transistor) transistors can also be used for the switching element. Additionally or alternatively, some embodiments may implement integrated circuits that use a MOSFET to shunt a Schottky diode to reduce heat should be considered in designs. They can be called "ideal diodes".

In an exemplary embodiment, SJPCs can be used to harvest power from micro-power sources. In some such cases, a switching frequency can be made arbitrarily low to operate when an input capacitor has received charge. For example, a small solar cell in the face of a watch can slowly collect power to charge a watch battery when the watch is placed in the sun.

In an exemplary embodiment, a power source may be either alternating current (AC) or direct current (DC). If the input power source is AC, it may be full-wave or half-wave rectified. Accordingly, an SJPC Joule transfer circuit may operate (switch) for a portion of the 50 or 60 cycle period when the instantaneous voltage is above a threshold. When the source voltage increases, the inductor charge time automatically decreases and as the source voltage decreases, the inductor charge time increases, providing constant Joule delivery for each cycle. If three phase AC (such as from wind generators) is rectified, the a DC voltage does not go below 0 volts.

In an exemplary embodiment, the innovative techniques described above may be applied to rescue electric cars that have run out of energy. For example, a tow truck or a police cruiser can carry a charged battery that can be loaned or connected to a stranded vehicle. In this scenario, an inductor in an SJPC may discharge directly into the vehicle's battery at a rate sufficient to get the vehicle to a next charging station, or alternatively at a maximum rate the vehicle's battery can accept charge. In an exemplary embodiment, a fuse may also be used for overload protection.

In an exemplary embodiment, an inductive element of the systems and methods described above can have two-leads, be tapped with different inductance values, variable inductance, or have a secondary winding.

In an embodiment, Joule delivery can be used for exact billing of delivered energy at vehicle charging stations or other energy monitoring applications, for example, in the production of a receipt or a billing invoice.

In some embodiments, an SJPC circuit can be used to correct AC power factor by varying an instantaneous load as a function of power line phase.

The SJPC principles described above are particularly useful both for finding MPP on an individual solar cell, and also for solar panels including a plurality of solar cells.

The present inventor further contemplates that the innovative systems and methods described above may be applied to heating applications, such as electric blankets or teapots. Conventional resistive heating results in variable Watt delivery when line voltages are high or low.

Switch on times and off times can be used to determine circuit anomalies, such as open or short circuits.

The SJPC energy transfer techniques of the embodiments herein further enable an electric automobile design with a low capacity permanent internal battery and additional standardized battery packs with SJPCs that can be rapidly exchanged at a charging station, thereby eliminating long wait times for vehicle recharging, or significantly reducing the wait time needed to charge a vehicle for relatively shorter car trips.

In at least one embodiment, parallel combined outputs from multiple SJPCs may be received by a load at a common shared transfer voltage that is chosen by the load. The load may elect to receive a given power at higher current at a lower voltage. This may be preferable for safety rules. Alternately, the load may elect to receive a given power as a lower current at a higher voltage. This approach may be preferable for higher efficiency. DC bus voltage is determined by the load.

In at least one embodiment, SJPCs may be used to combine energy from other sources other than solar panels.

For example, a wind turbine also needs to be maintained at an optimal MPP, influenced by wind speed and propeller revolutions per minute. The three phase output of a wind generator can be rectified to produce a DC voltage which may be maintained at its MPP.

Exemplary embodiments of systems and methods for solar energy collection, control, and distribution are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this explanatory technique is for convenience and/or ease of explanation. In accordance with the principles of the systems and methods described herein, any feature of a drawing may be referenced or claimed in combination with any feature of any other drawing. For example, the following list of example claims represents only some of the potential combinations of elements possible from the systems and methods described herein.

a(i). A universal power conversion system for a solar panel array, comprising: a first solar panel configured to generate a first power output; a second solar panel configured to generate a second power output different from the first power output; a common direct current (DC) bus in operable communication with the first and second solar panels; a first switching power converter disposed between the first solar panel and the common DC bus, and configured to (i) receive the first power output, and (ii) output a third power output maintained at a first maximum power point (MPP); a controller configured to (i) receive, from the common DC bus, the third power output at the first MPP, (ii) receive, from the common DC bus, the second power output in parallel with the third power output, wherein the second power output is maintained at a second MPP to achieve an MPP-maintained fourth power output, (iii) combine the third power output with the MPP-maintained fourth power output, and (iv) produce a combined output for a destination sink.

a(ii). The system of claim a(i), wherein the destination sink includes at least one of an inverter, a battery, and a resistive load.

a(iii). The system of claim a(i), wherein the combined output is one of a direct current (DC) output, an alternating current (AC) output, or a multi-phase AC output.

a(iv). The system of claim a(i), wherein the first switching power converter comprises at least one of a buck converter, a boost converter, and a buck-boost converter.

a(v). The system of claim a(i), wherein the second power output connects directly to the common DC bus.

a(vi). The system of claim a(v), wherein the controller is further configured to maintain the MPP-maintained fourth power output at the second MPP.

a(vii). The system of claim a(i), wherein the first switching power converter is further configured to generate the third power output as a first plurality of discrete energy packets over time to the common DC bus at a first packet delivery rate.

a(viii). The system of claim a(vii), further comprising a second switching power converter (i) connected to the common DC bus, (ii) disposed between the second solar panel, (iii) configured to receive the second power output from the second solar panel, and (iv) output the MPP-maintained fourth power output to the common DC bus at the second MPP.

a(ix). The system of claim a(viii), wherein the second switching power converter is further configured to generate the third power output as a second plurality of discrete energy packets over time to the common DC bus at a second packet delivery rate different from the first packet delivery rate.

a(x). The system of claim a(ix), wherein each first energy packet of the first plurality of discrete energy packets has substantially the same per-packet energy, in Joules-per-packet, as (i) other first energy packets of the first plurality of discrete energy packets, and (ii) each second energy packet of the second plurality of discrete energy packets.

a(xi). The system of claim a(ix), wherein at least one of the first and second power converters is further configured to dynamically decrease the per-packet energy of each respective discrete energy packet by (i) decreasing a maximum inductor current value of the respective power converter, (ii) increasing a minimum inductor current value of the respective power converter, and/or (iii) decreasing a switching frequency of the respective first or second packet delivery rates.

a(xii). The system of claim a(i), further comprising a controller configured to track the first MPP and the second MPP over time.

a(xiii). The system of claim a(xii), wherein controller is further configured to calculate, from a histogram of at least one of the first MPP and the second MPP, a total energy value of at least one of the third and fourth power outputs over time.

b(i). A universal power conversion system for solar energy collection and distribution, comprising: a first switching power converter connected to a common direct current (DC) bus and configured to (i) receive a first input voltage from a first solar panel, and (ii) output a first plurality of discrete energy packets over time to the common DC bus at a first packet delivery rate; a second switching power converter connected to the common DC bus and configured to (i) receive a second input voltage from a second solar panel different from the first solar panel, and (ii) output a second plurality of discrete energy packets over time to the common DC bus at a second packet delivery rate different from the first packet delivery rate, wherein the second input voltage is less than the first input voltage, wherein each first energy packet of the first plurality of discrete energy packets has substantially the same per-packet energy, in Joules-per-packet, as (i) other first energy packets of the first plurality of discrete energy packets, and (ii) each second energy packet of the second plurality of discrete energy packets, and wherein the common DC bus is configured to deliver all of the first and second energy packets to a destination sink at respectively, substantially same per-packet energy.

b(ii). The system of claim b(i), wherein the destination sink includes at least one of an inverter, a battery, and a resistive load.

b(iii). The system of claim b(i), wherein the first switching power converter comprises at least one of a buck converter, a boost converter, and a buck-boost converter.

b(iv). The system of claim b(i), wherein the second switching power converter includes a boost converter configured to output the second plurality of discrete energy packets at a second output voltage greater than the second input voltage.

b(v). The system of claim b(i), wherein at least one of the first and second power converters is further configured to dynamically decrease the per-packet energy of each respective discrete energy packet by (i) decreasing a maximum inductor current value of the respective power converter, (ii) increasing a minimum inductor current value of the respective power converter, and/or (iii) decreasing a switching frequency of the respective first or second packet delivery rates.

c(i). A method of delivering a plurality of discrete energy packets from a first solar panel to a destination sink as a plurality of sequential discrete energy packets, comprising: charging an inductor, from the first solar panel, to a percentage of a predetermined maximum inductor current value for the inductor; discharging, to the destination sink, the inductor to a minimum inductor current value; setting a switching cycle according to a rate of the charging and discharging of the inductor; determining a per-packet energy value, in Joules, corresponding to one pulse of the switching cycle; calculating (i) an amount of Joules required to deliver a predetermined total energy amount to the destination sink, (ii) a number of pulses needed to reach the required amount of Joules; generating a plurality of pulses according to the switching cycle, wherein each generated pulse of the plurality of pulses corresponds to a respective energy packet of the plurality of sequential discrete energy packets; counting pulses of the generated plurality of pulses; and executing, upon reaching the number of pulses needed to reach the required amount of Joules, at least one of (i) shutting down operation of the converter, and (ii) placing the converter in standby or float mode.

c(ii). The method of claim c(i), further comprising changing an energy delivery rate to the destination sink by at least one of (i) increasing or decreasing the per-packet energy value of a pulse, and (ii) increasing or decreasing a packet delivery rate.

d(i). A controller for a universal power converter having an input power source, an inductor, a switch, and an output to a destination sink, the controller comprising a processor and a memory configured to store computer-executable instructions therein, which, when executed by the processor, cause the controller to: charge the inductor, from the input power source, to a percentage of a predetermined maximum inductor current value for the inductor; discharge, to the output, the inductor to a minimum inductor current value; set a switching cycle according to a charge rate and a discharge rate of the inductor; determine a per-packet energy value, in Joules, corresponding to one pulse of the switching cycle; calculate (i) an amount of Joules required to deliver a predetermined total energy amount to the destination sink, and (ii) a number of pulses needed to reach the required amount of Joules; generate a plurality of pulses according to the switching cycle, wherein each generated pulse of the plurality of pulses contains substantially the same determined per-packet energy; count pulses of the generated plurality of pulses; and executing, upon reaching the number of pulses needed to reach the required amount of Joules, at least one of (i) shutting down operation of the converter, and (ii) placing the converter in standby or float mode.

d(ii). The controller of claim d(i), wherein the input power source comprises a solar panel.

d(iii). The controller of claim d(i), wherein the destination sink includes at least one of an inverter, a voltage converter, a bus, a battery, a resistive load, a light, a thermal load, and a bus connecting another controller to a common load.

d(iv). The controller of claim d(i), wherein the universal power converter is one of a buck converter, a boost converter, and a buck-boost converter.

d(v). The controller of claim d(i), wherein a value of the input power source is variable, wherein the instructions further cause the converter to operate in continuous mode, and wherein the minimum inductor current value is greater than zero.

d(vi). The controller of claim d(v), wherein the per-packet energy value is determined according to: $E_{cycle}=\frac{1}{2}L*I_{max}^2-\frac{1}{2}L*I_{min}^2$, where $I_{max}$ is the maximum inductor current value, L is an inductance value of the inductor, $I_{min}$ is the minimum inductor current value, and $E_{cycle}$ is the amount of Joules delivered per pulse of the switching cycle as a discrete energy packet, and wherein $E_{cycle}$ is held substantially constant for each pulse of the generated plurality of pulses.

d(vii). The controller of claim d(v), wherein the instructions further cause the converter to increase a frequency of the switching cycle to speed up an energy transfer rate to the output.

d(viii). The controller of claim d(v), wherein the instructions further cause the converter to decrease a frequency of the switching cycle to slow an energy transfer rate to the output.

d(ix). The controller of claim d(i), wherein the instructions further cause the converter to change the per-packet energy value based on a current capacity or a voltage capacity of the destination sink.

d(x). The controller of claim d(i), wherein the instructions further cause the converter to operate in discontinuous mode, wherein the switching cycle is periodic, and wherein the instructions further cause the converter to deliver the predetermined total energy amount according to: $P_d=(\frac{1}{2}\ L*I_{peak}^2)*N$, where $I_{peak}$ is a peak inductor current determined by the controller, L is the inductance value of the inductor, N represents a numerical count of the periodic switching cycles, and $P_d$ is the total amount of power delivered to the destination sink.

d(xi). The controller of claim d(x), wherein the instructions further cause the converter to adjust $I_{peak}$ to alter the determined per-packet energy value.

d(xii). The controller of claim d(i), comprising at least one of an application specific integrated circuit (ASIC), a programmable logic integrated circuit (PLIC), and a microprocessor.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

The computer-implemented methods discussed herein may include additional, fewer, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A universal power conversion system for a solar panel array, comprising:

a first solar panel configured to generate a first power output;

a second solar panel configured to generate a second power output different from the first power output;

a common direct current (DC) bus in operable communication with the first and second solar panels;

a first switching power converter disposed between the first solar panel and the common DC bus, and configured to (i) receive the first power output, and (ii) output a third power output maintained at a first maximum power point (MPP);

a controller configured to (i) receive, from the common DC bus, the third power output at the first MPP, (ii) receive, from the common DC bus, the second power output in parallel with the third power output, wherein the second power output is maintained at a second MPP to achieve an MPP-maintained fourth power output, and (iii) combine the third power output with the MPP-maintained fourth power output, and (iv) produce a combined output for a destination sink.

2. The system of claim 1, wherein the destination sink includes at least one of an inverter, a battery, and a resistive load.

3. The system of claim 1, wherein the combined output is one of a DC output, an alternating current (AC) output, or a multi-phase AC output.

4. The system of claim 1, wherein the first switching power converter comprises at least one of a buck converter, a boost converter, and a buck-boost converter.

5. The system of claim 1, wherein the second power output connects directly to the common DC bus.

6. The system of claim 5, wherein the controller is further configured to maintain the MPP-maintained fourth power output at the second MPP.

7. The system of claim 1, wherein the first switching power converter is further configured to generate the third power output as a first plurality of discrete energy packets over time to the common DC bus at a first packet delivery rate.

8. The system of claim 7, further comprising a second switching power converter (i) connected to the common DC bus, (ii) disposed between the second solar panel and the common DC bus, (iii) configured to receive the second power output from the second solar panel, and (iv) output the MPP-maintained fourth power output to the common DC bus at the second MPP.

9. The system of claim 8, wherein the second switching power converter is further configured to generate the fourth power output as a second plurality of discrete energy packets over time to the common DC bus at a second packet delivery rate different from the first packet delivery rate.

10. The system of claim 9, wherein each first energy packet of the first plurality of discrete energy packets has substantially the same per-packet energy, in Joules-per-packet, as (i) other first energy packets of the first plurality of discrete energy packets, and (ii) each second energy packet of the second plurality of discrete energy packets.

11. The system of claim 9, wherein at least one of the first and second power converters is further configured to dynamically decrease the per-packet energy of each respective discrete energy packet by (i) decreasing a maximum inductor current value of the respective power converter, (ii) increasing a minimum inductor current value of the respective power converter, and/or (iii) decreasing a switching frequency of the respective first or second packet delivery rates.

12. The system of claim 1, wherein the controller is further configured to track the first MPP and the second MPP over time.

13. The system of claim 12, wherein the controller is further configured to calculate, from a histogram of at least one of the first MPP and the second MPP, a total energy value of at least one of the third and fourth power outputs over time.

14. A universal power conversion system for solar energy collection and distribution, comprising:

a first switching power converter connected to a common direct current (DC) bus and configured to (i) receive a first input voltage from a first solar panel, and (ii) output a first plurality of discrete energy packets over time to the common DC bus at a first packet delivery rate;

a second switching power converter connected to the common DC bus and configured to (i) receive a second input voltage from a second solar panel different from the first solar panel, and (ii) output a second plurality of discrete energy packets overtime to the common DC bus at a second packet delivery rate different from the first packet delivery rate;

wherein the second input voltage is less than the first input voltage, wherein each first energy packet of the first plurality of discrete energy packets has substantially the same per-packet energy, in Joules-per-packet, as (i) other first energy packets of the first plurality of discrete energy packets, and (ii) each second energy packet of the second plurality of discrete energy packets, and wherein the common DC bus is configured to deliver all of the first and second energy packets to a destination sink at respectively, substantially same per-packet energy.

15. The system of claim 14, wherein the destination sink includes at least one of an inverter, a battery, and a resistive load.

16. The system of claim 14, wherein the first switching power converter comprises at least one of a buck converter, a boost converter, and a buck-boost converter.

17. The system of claim 14, wherein the second switching power converter includes a boost converter configured to output the second plurality of discrete energy packets at a second output voltage greater than the second input voltage.

18. The system of claim 14, wherein at least one of the first and second power converters is further configured to dynamically vary (i) a maximum inductor current value of the respective power converter, (ii) a minimum inductor current value of the respective power converter, and/or (iii) a switching frequency of at least one of the respective first or second packet delivery rates.

19. A method of delivering a plurality of discrete energy packets from a first solar panel to a destination sink as a plurality of sequential discrete energy packets, comprising:

(a) charging an inductor, from the first solar panel, to a percentage of a predetermined maximum inductor current value for the inductor;

(b) discharging, to the destination sink, the inductor to a minimum inductor current value;

(c) setting a switching cycle according to a rate of the charging and discharging of the inductor;

(d) determining a per-packet energy value, in Joules, corresponding to one pulse of the switching cycle;

(e) calculating (i) an amount of Joules required to deliver a predetermined total energy amount to the destination sink, (ii) a number of pulses needed to reach the required amount of Joules;

(f) generating a plurality of pulses according to the switching cycle, wherein each generated pulse of the plurality of pulses corresponds to a respective energy packet of the plurality of sequential discrete energy packets;

(g) counting pulses of the generated plurality of pulses; and (h) executing, upon reaching the number of pulses needed to reach the required amount of Joules, at least one of (i) shutting down operation of the converter, and (ii) placing the converter in standby or float mode.

20. The method of claim 19, further comprising changing an energy delivery rate to the destination sink by at least one of (i) increasing or decreasing the per-packet energy value of a pulse, and (ii) increasing or decreasing a packet delivery rate.

* * * * *